US007680736B2

(12) United States Patent
Jarman et al.

(10) Patent No.: US 7,680,736 B2
(45) Date of Patent: Mar. 16, 2010

(54) PAYMENT SYSTEM

(75) Inventors: Jonathan S. Jarman, London (GB); Paul A. Newman, London (GB); Lucy H. Newman, Kent (GB); Alan L. Leibert, Richmonzurth (GB)

(73) Assignee: Freedom Card Limited, London (GB)

( * ) Notice: Subject to any disclaimer, the term of this patent is extended or adjusted under 35 U.S.C. 154(b) by 1588 days.

(21) Appl. No.: 10/474,050

(22) PCT Filed: Apr. 8, 2002

(86) PCT No.: PCT/GB02/01634

§ 371 (c)(1),
(2), (4) Date: Aug. 13, 2004

(87) PCT Pub. No.: WO02/082386

PCT Pub. Date: Oct. 17, 2002

(65) Prior Publication Data

US 2005/0033692 A1 Feb. 10, 2005

(30) Foreign Application Priority Data

Apr. 6, 2001 (GB) ................................ 0108723.8

(51) Int. Cl.
*G06Q 40/00* (2006.01)
(52) U.S. Cl. .............................. 705/41; 705/44; 705/39; 705/64; 705/67; 705/76; 705/26; 235/380; 235/381; 235/382; 235/382.5; 235/383
(58) Field of Classification Search .................. 705/26, 705/41, 39, 64, 67, 76, 44; 235/380–383
See application file for complete search history.

(56) References Cited

U.S. PATENT DOCUMENTS

| 4,862,501 | A | | 8/1989 | Kamitake et al. |
| 5,623,547 | A | | 4/1997 | Jones et al. |
| 6,073,841 | A | * | 6/2000 | Walton ....................... 235/382 |
| 6,282,522 | B1 | * | 8/2001 | Davis et al. ................... 705/41 |
| 6,366,894 | B1 | * | 4/2002 | Everett et al. ................. 705/76 |

FOREIGN PATENT DOCUMENTS

| EP | 0256768 | 2/1988 |
| EP | 0421808 | 4/1991 |
| EP | 0668579 | 8/1995 |

(Continued)

OTHER PUBLICATIONS

Unknown, May 11, 2000, www.angieslist.com.*

*Primary Examiner*—James P Trammell
*Assistant Examiner*—Scott S Trotter
(74) *Attorney, Agent, or Firm*—Lowenstein Sandler PC

(57) ABSTRACT

An electronic transaction payment system is provided having a vendor terminal associated with a vendor who provides goods or services to a purchaser, a vendor smart-card and a vendor smart-card reader for transmitting data to and receiving data from the vendor smart-card. The system also includes a purchaser smart-card reader which is connected to the vendor terminal and which is operable for transmitting data to and receiving data from a purchaser smart-card. In operation, payment for goods purchased by the purchaser is made between the purchaser smart-card and the vendor smart-card. In a preferred embodiment, the payment data is encrypted using an encryption key specific to the transaction between the purchaser and the vendor. A third party registry terminal may also be provided for providing validation of the vendor and/or the purchaser.

40 Claims, 24 Drawing Sheets

FOREIGN PATENT DOCUMENTS

| | | |
|---|---|---|
| EP | 0807908 | 11/1997 |
| EP | 0940784 | 9/1999 |
| WO | WO 0030051 | 5/2000 |
| WO | WO 0077746 | 12/2000 |

* cited by examiner

PAYMENT SYSTEM

This invention relates to a payment system and in particular but not exclusively to a smart-card payment system wherein an entire purchase operation is explicitly linked as a single transaction and a variable level of user validation is provided.

Existing payment systems suffer from a number of drawbacks. The use of cash for example is limited by the requirement for the actual transfer of possession of physical tokens and by the fact that if lost or stolen, cash is usable without restriction by a finder or thief.

The use of cheques goes some way to overcome the security worries of carrying cash but still requires the transfer of a physical token. Cheques also introduce the problem of "clearing time", that is, time taken by banks to actually transfer money from the cheque writer's account to the cheque receiver's account. In addition, there is a possibility with a cheque that a bank may refuse to honour a cheque written by an account holder because the account holder has insufficient funds in their account. In this circumstance, the receiver of the cheque has then transferred ownership of goods or provided a service and has received no payment for those goods or that service.

For ordering goods by telephone or using the internet, cash is totally unsuitable and cheques are very inconvenient because to pay by cheque for goods ordered by telephone or over the internet requires the order placed using the telephone or the internet to be confirmed in writing accompanied by a cheque for payment.

More suitable for use with internet or telephone orders are credit and debit cards. When using a credit card, payment for the goods is actually made to the retailer by a credit card company which allows the credit card user to spend up to a predetermined borrowing limit for purchases. Purchases made with a credit card must be paid for to the credit card company within a predetermined time limit or interest on the money borrowed becomes payable. Debit cards on the other hand provide for an electronic transfer of funds direct from the card holder's bank account to the retailer's bank account. Credit and debit cards also suffer from the problems of "clearing time".

Both credit and debit cards use conventional magnetic stripe card technology. Both payment systems also suffer from processing charges inherent in the system. These processing charges are typically levied on the vendor and may be in the range of one to four percent of the sale transaction. Sometimes all or part of this cost is passed onto the purchaser. This transaction cost has a minimum size which is set by the banks and credit card companies operating the cards. As a result, it is economically disadvantageous to process small value transactions using credit and debit cards.

Credit and debit cards do however have the advantage for telephone and internet transactions that there is no requirement for the transfer of physical tokens. They can therefore be used to make purchases or to reserve restaurant tables for example, without the need for postal or personal transfer of payment. The use of a credit card to make a purchase provides the purchaser with extra protection in that the credit card company must cover the cost of goods paid for on the card, over a certain minimum value, which are not delivered or with which there are certain other problems. In addition, the credit card operator pays the vendor regardless of whether or not the purchaser ever repays that money to the credit card company. Thus both vendor and purchaser benefit from the use of a credit card. However, for telephone and internet transactions, which are defined by the credit card operator as "card holder not present" transactions, the risk of loss rests with the retailer not the card operator. Thus, it becomes less beneficial for a vendor to accept credit cards as payment for telephone and internet orders because they must pay the handling fee and they receive no protection.

The so-called electronic purse (e.g. the Mondex Electronic Purse System) has been developed to eliminate the problems of carrying actual cash and of the minimum processing charges for small debit or credit card transactions. The electronic purse makes use of smart-card or chip-card technology. To use the electronic purse, the user must either load cash onto the smart-card electronic purse at a vending machine or at the desk of a load agent such as a Post Office, or the user must transfer funds from their bank account or credit card to the smart-card electronic purse. The purse may then be used to make purchases in the real world, over the internet or over the telephone, subject to the telephone being with an appropriate smart-card reader.

From a transaction processing point of view, full clearing would only be required when loading the purse, which would normally be a medium to large value transaction and therefore acceptable. Payments could be batched into daily totals and cleared to the retailers as single daily transactions, again being of reasonable size. There would be no requirement to account for every transaction back to the card holder, all that would happen would be that payment would be made out of the cash float created when taking cash to load the electronic purse.

Thus from a bank's point of view, the electronic purse solved a major problem. However, from the card holder's point of view the electronic purse is less successful and all open electronic purse trials have tended towards failure in terms of take up. Among the reasons for the poor take up are: poor education of the card holders, small scale trials leading to purse being usable at only a few locations, lock-in of card holder money to the card and places it could be used, no interest on prepayment, requirement for a bank account to back the electronic purse and fear over security and transaction accountability.

The requirement for a bank account to back the electronic purse is a major failing of the system. This is because many people who could best benefit from an electronic purse (or other prepaid mechanisms) are those people who do not have bank accounts and who are therefore automatically excluded from using cheques, debit cards or credit cards. Approximately twenty percent of the UK population are disallowed by the banks from having a bank account. It should be noted that the Mondex Electronic Purse System was specifically developed to allow use by persons not having a bank account, however the operators still insisted on a user having a bank account before a card would be issued.

Regarding fear over security and transaction accountability, the problem is one of how much the card holder trusts the retailer. For example, how does the card holder know how much credit is stored on his or her card and how do they know how much is removed? For internet transactions, this problem grows to incorporate issues such as: how to identify how much is being deducted from the card, how to identify the other party to the transaction, how to identify the location of the other party to the transaction, whether goods will actually be shipped, whether the payment made will actually go to the vendor, whether the vendor will recognise the payment as being against the goods purchased, whether the payment could be fraudulently redirected and concerns over who will be able to see the delivery address specified.

The existing electronic purse schemes use so-called smart-cards or chip-cards. These are cards having a microprocessor and memory mounted onto or into a card, with an interface provided for the microprocessor to be powered and interfaced with by a reader. The standards for smart-cards where the interface is by means of physical connection terminals are set out in ISO 7816. The standards for smart-cards where the interface is by means of radio signals (including supply of power) are set out in ISO 14443.

In an attempt to address some of the above problems, a number of banks and financial card operators including Mastercard and Visa have agreed a smart-card standard for credit and debit services such that a retailer could have a common terminal to support all smart credit and debit cards in a similar manner to the current situation with magnetic stripe cards. This standard is known as EMV (Europay Mastercard Visa) and it applies to credit and debit services on smart-cards as well as the terminals to support them. An electronic purse system based on the EMV specifications is the common electronic purse specifications (CEPS) with which the European Standard Organisation (CEN) has been involved. CEPS requires a personalised system and additional hardware to identify the cardholder in order for him or her to digitally sign and certify all CEPS transactions. Further, for use in telephone or internet transactions, there is a requirement in CEPS for digital signatures. There is currently no worldwide or European standard for producing digital signatures. Such digital signatures require a public key infrastructure administered by a certification authority which acts as a library or directory of public keys. In addition, when it supplies a public key it adds a certificate signed with its own private key such that the recipient can then validate that the public key information is genuine within Europe, the various public key infrastructures that currently exist are not compatible and therefore such digital signatures are not interoperable across services and countries. Thus the full implementation of CEPS will be delayed until such standardisation can be completed.

In summary therefore, cash and cheques require the exchange of physical tokens and are therefore totally unsuitable for real time trading by telephone or over the internet. Credit and debit cards and cheques suffer from clearing time delays. Credit and debit cards are also unsuitable for small value transactions due to the processing charges included. Electronic purses have been unpopular due to the "tied-in" nature of the funds and the small number of places where trials have allowed use of the purses. Credit and debit cards and electronic purses have the additional problem for internet and telephone transactions of requiring trust between purchaser and vendor. CEPs has the drawback of an awkward and non-standard security system.

Aspects of the present invention relate to a smart-card payment system wherein:
  provision is made for payment by means of prepaid value stored on a card held by the purchaser (the so-called electronic purse);
  provision is made for payment by means of credit by a third party on behalf of the purchaser and accessed by means of a smart-card held by the purchaser (the so-called credit card facility);
  provision is made for payment by means of prepaid value stored on behalf of the purchaser and accessed by means of a smart-card held by the purchaser (the so-called debit card facility);
  provision is made for different levels of validation between the purchaser and the vendor including third party validation if required;
  the provision of a third party registry to permit the movement of value or funds between the registry and the smart-card;
  payment may be anonymous or personalised;
  the purchaser may use either of the electronic purse and debit card facilities without having to pass any means test, credit check or hold a bank account; and
  a system in which an entire purchase operation is inextricably linked as a single transaction and variable levels of user (purchaser and/or vendor) validation is provided.

The present invention seeks to address difficulties of the prior art. According to one aspect, there is provided an electronic transaction payment system comprising a vendor terminal associated with a vendor who provides goods or services to a purchaser; a vendor smart-card; a vendor smart-card reader for transmitting data to and receiving data from the vendor smart-card; a purchaser smart-card reader for transmitting data to and receiving data from a purchaser smart-card. The vendor terminal comprises means for processing requests for vendor goods or services from the purchaser, means for generating cost data identifying the cost of requested goods or services and means for transmitting the cost data to the purchaser smart-card. The purchaser smart-card includes means for receiving the cost data from the vendor terminal and means for encrypting the payment data for transmission back to the vendor smart-card. The vendor smart-card also includes means for receiving the encrypted payment data and means for decrypting the payment data to obtain payment for the requested goods or services.

Preferably, all communications relating to the purchase of the goods pass from the purchaser's smart-card to the vendor and are encrypted with an encryption key specific to the current transaction. In this way, payment of the goods and/or services can be inextricably linked to the transaction itself. The invention can be applied for electronic trading on, for example, the Internet and can be used at traditional points of sale.

In a preferred embodiment, a third party registry is provided to provide guarantees for the purchaser and/or the vendor if required. The third party registry may provide additional support as requested and to a level requested by the vendor or purchaser, to ensure trust and confidence in the trade. Either party in the transaction may choose to validate the credentials of the other party by making a reference to the third party registry. In this case, the registry will provide the information and may levy an appropriate fee.

Preferred embodiments of the present invention will now be described by way of example only with reference to the accompanying drawings, in which.

Figure 5:
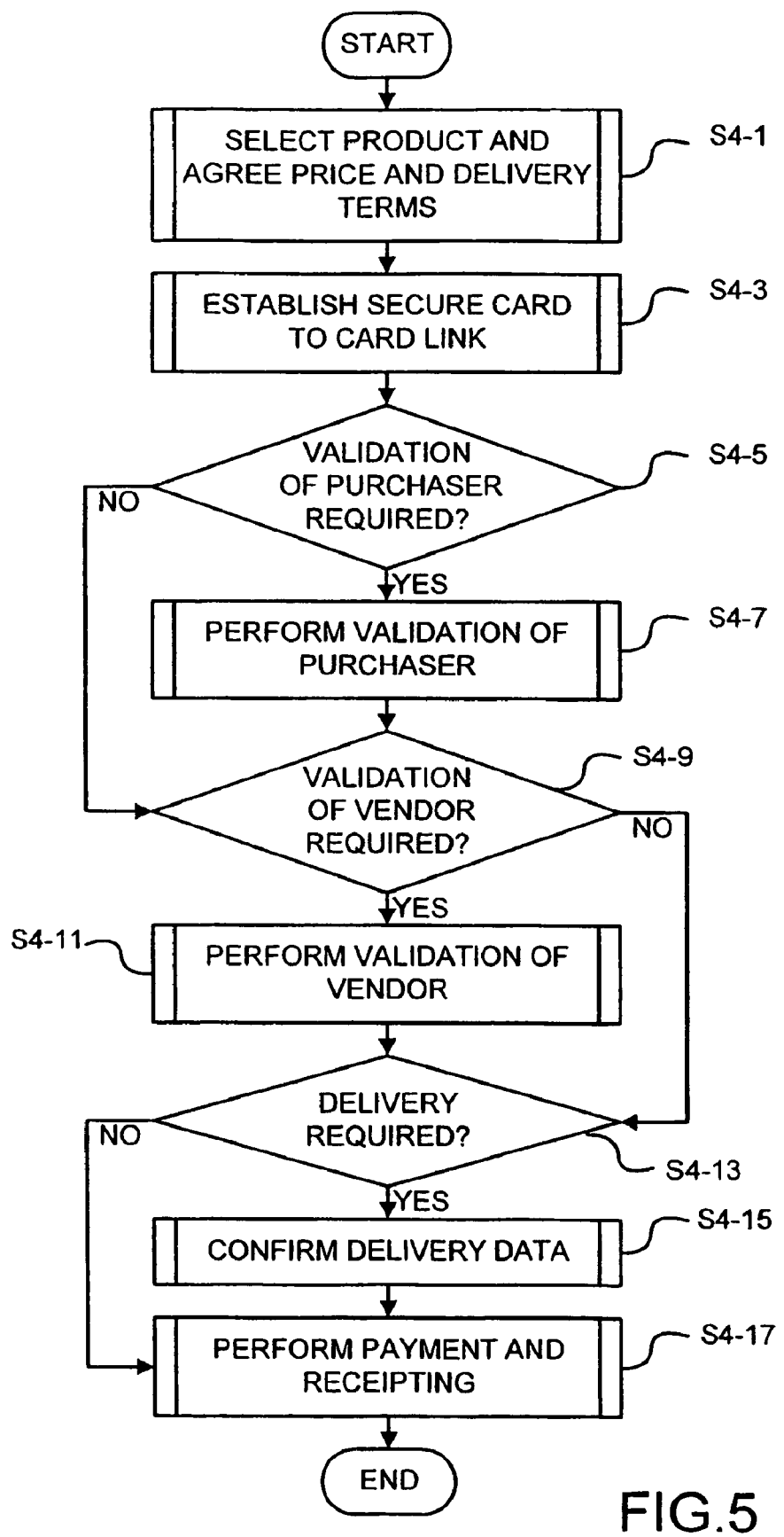
FIG. 5 is a flow chart showing the main processing steps performed by the terminals in FIG. 1 to process a transaction.
Figure 7A:
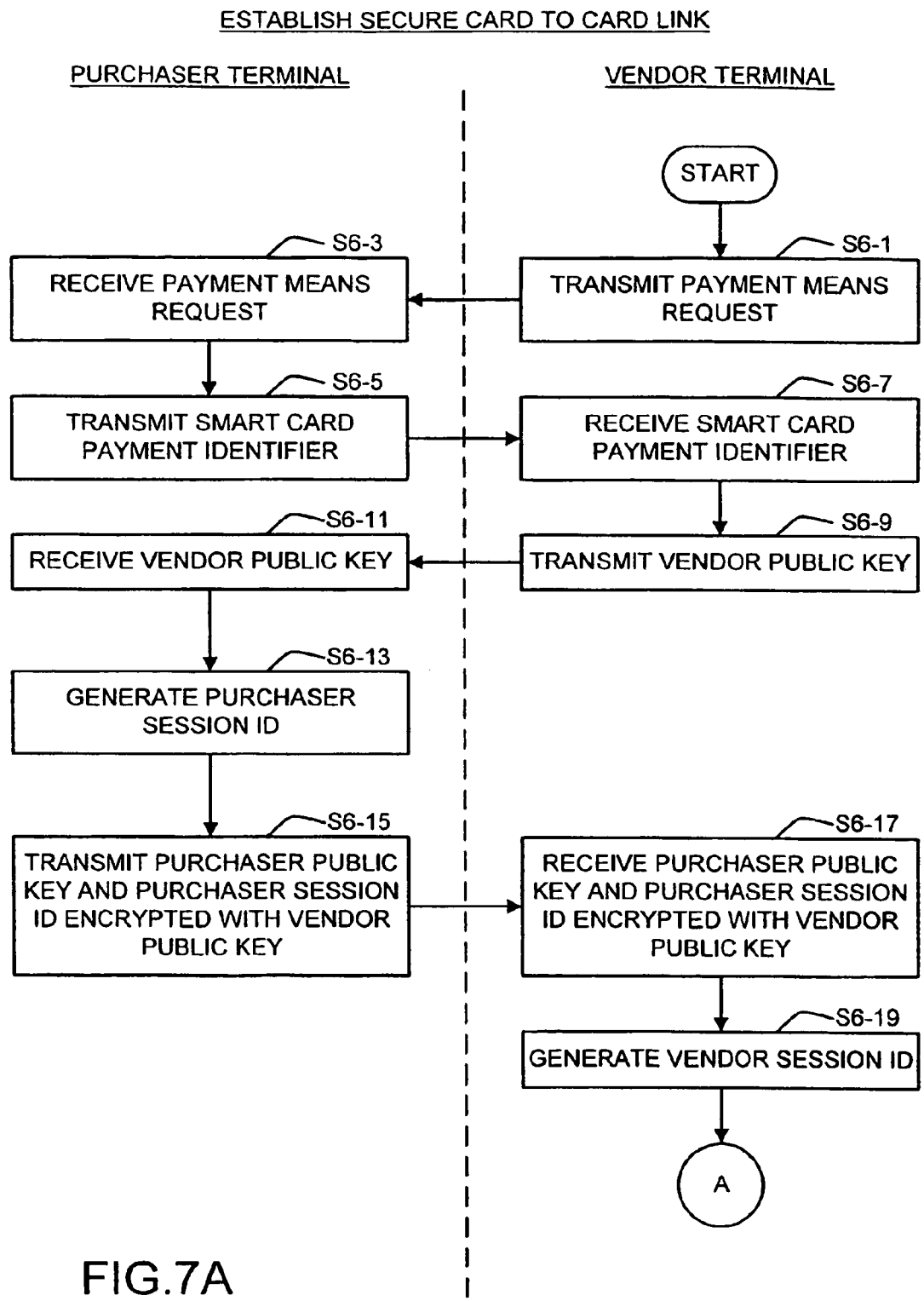
Figure 7B:
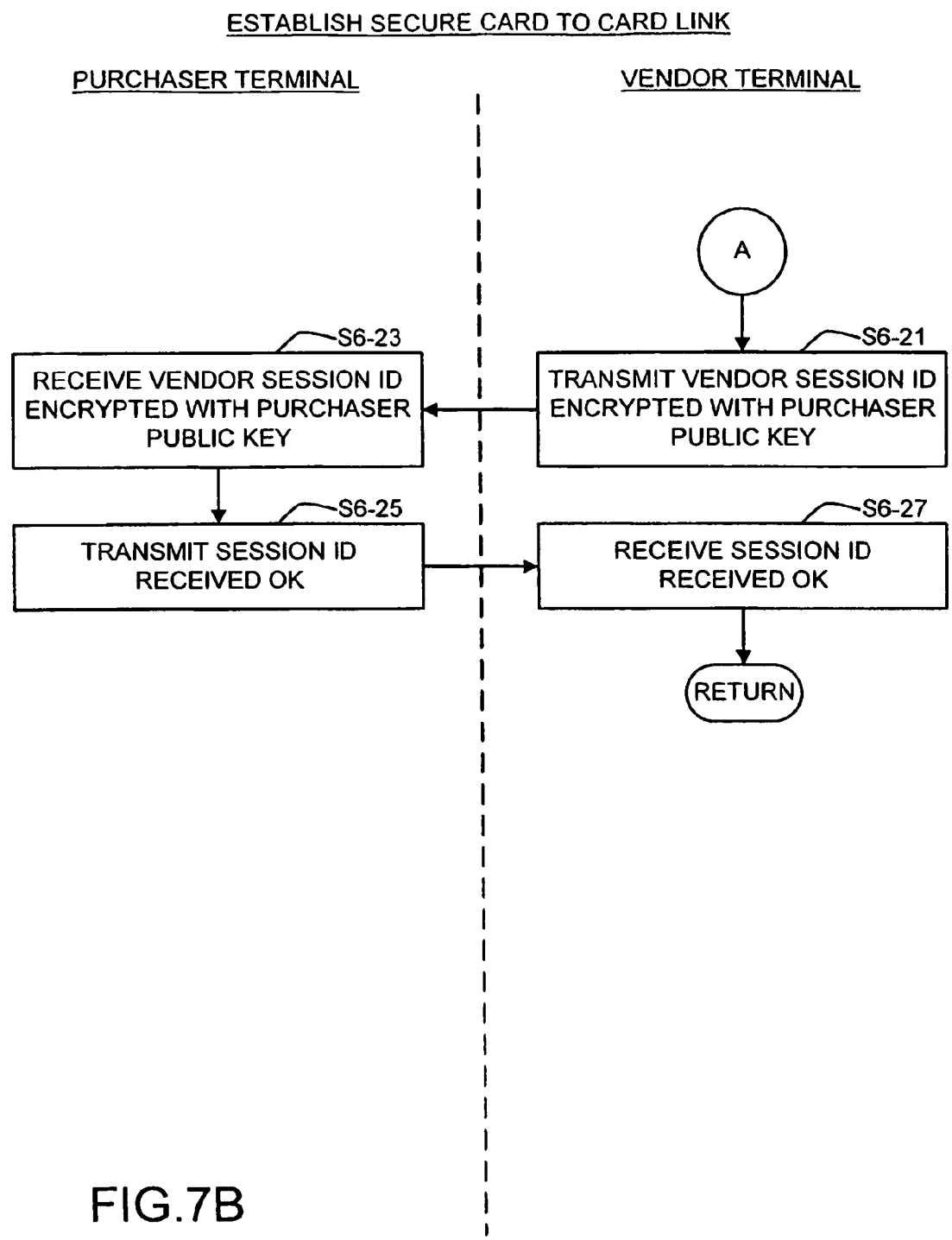
Figure 8:
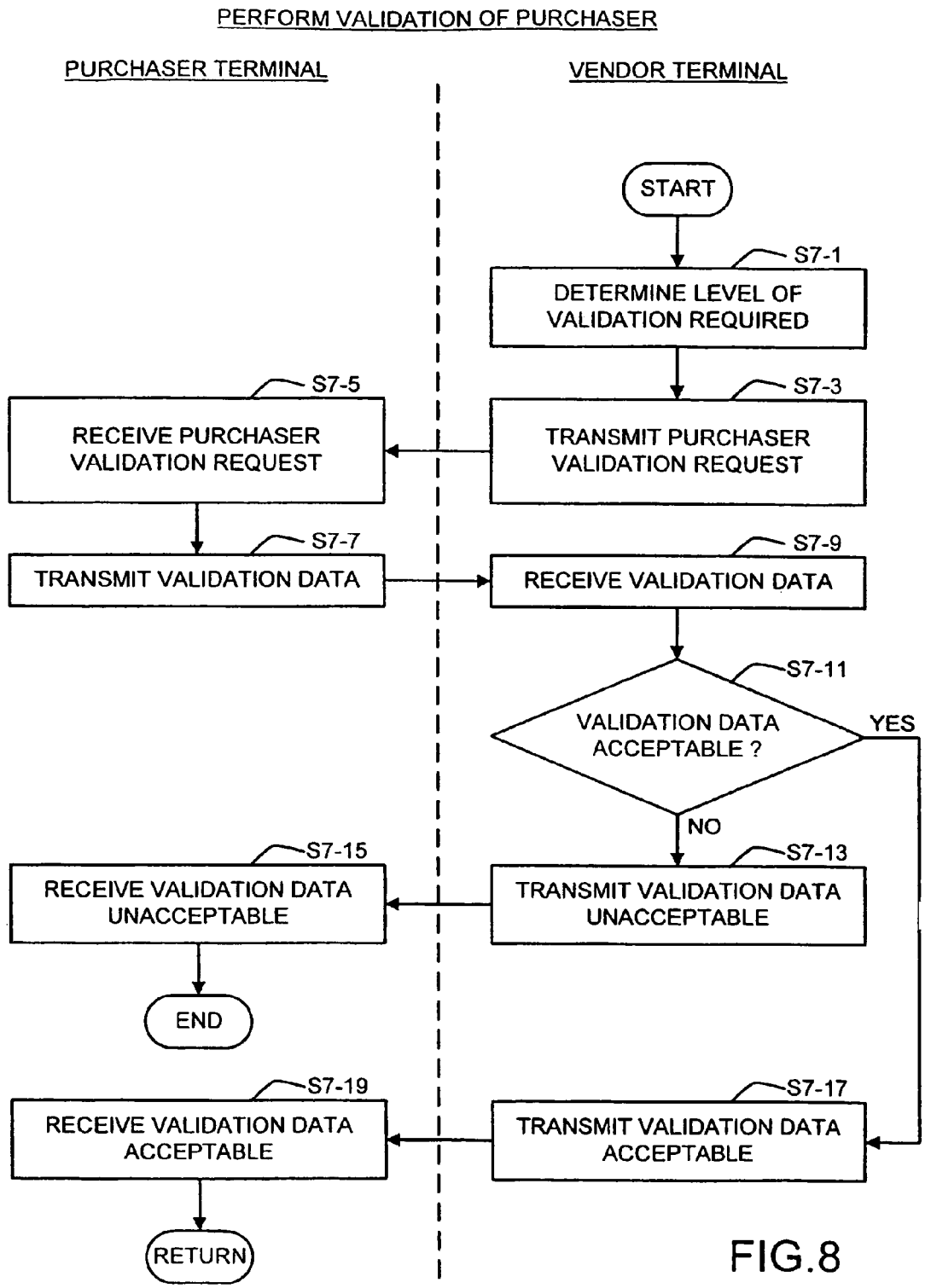
Figure 9:
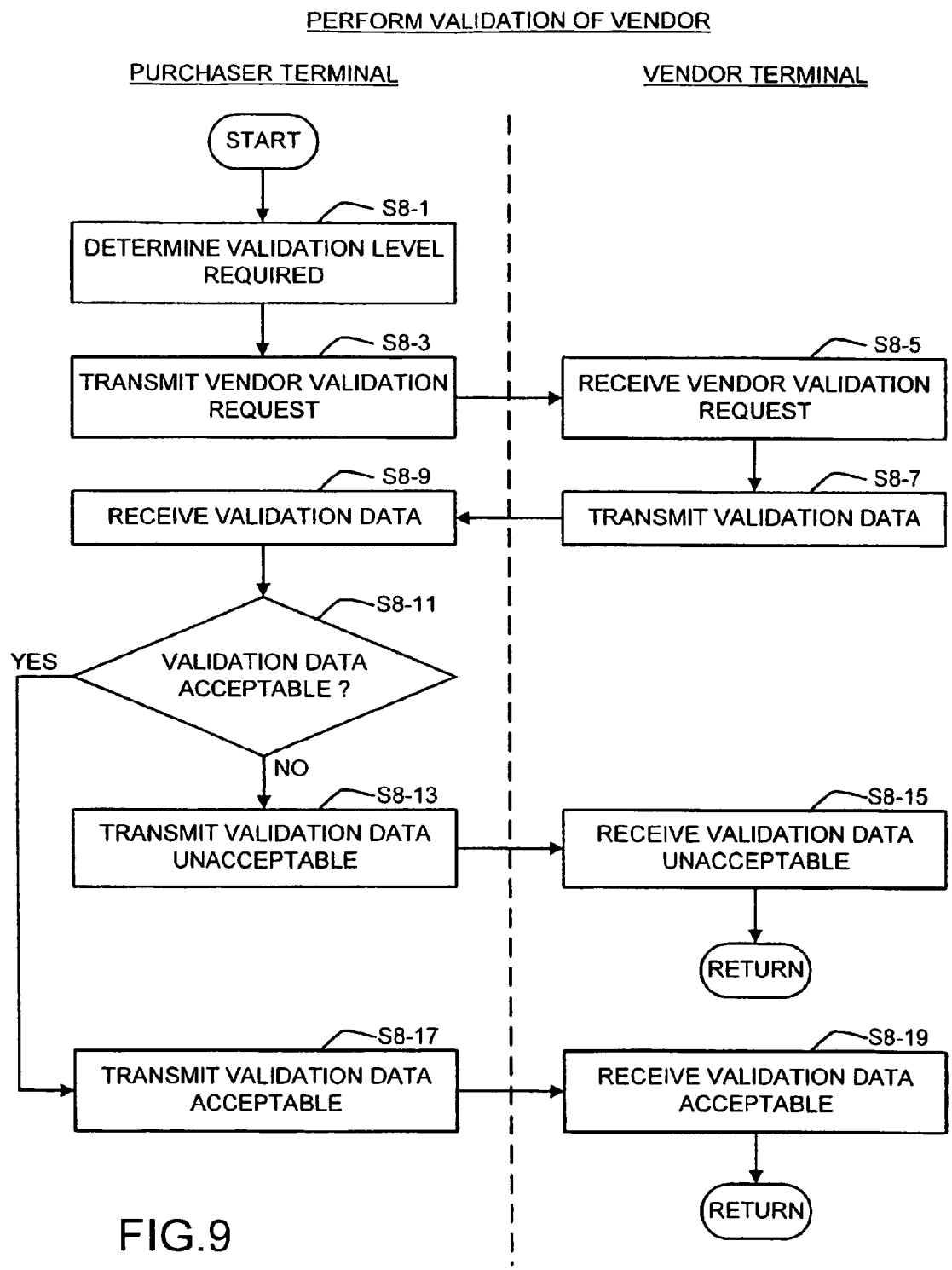
Figure 10:
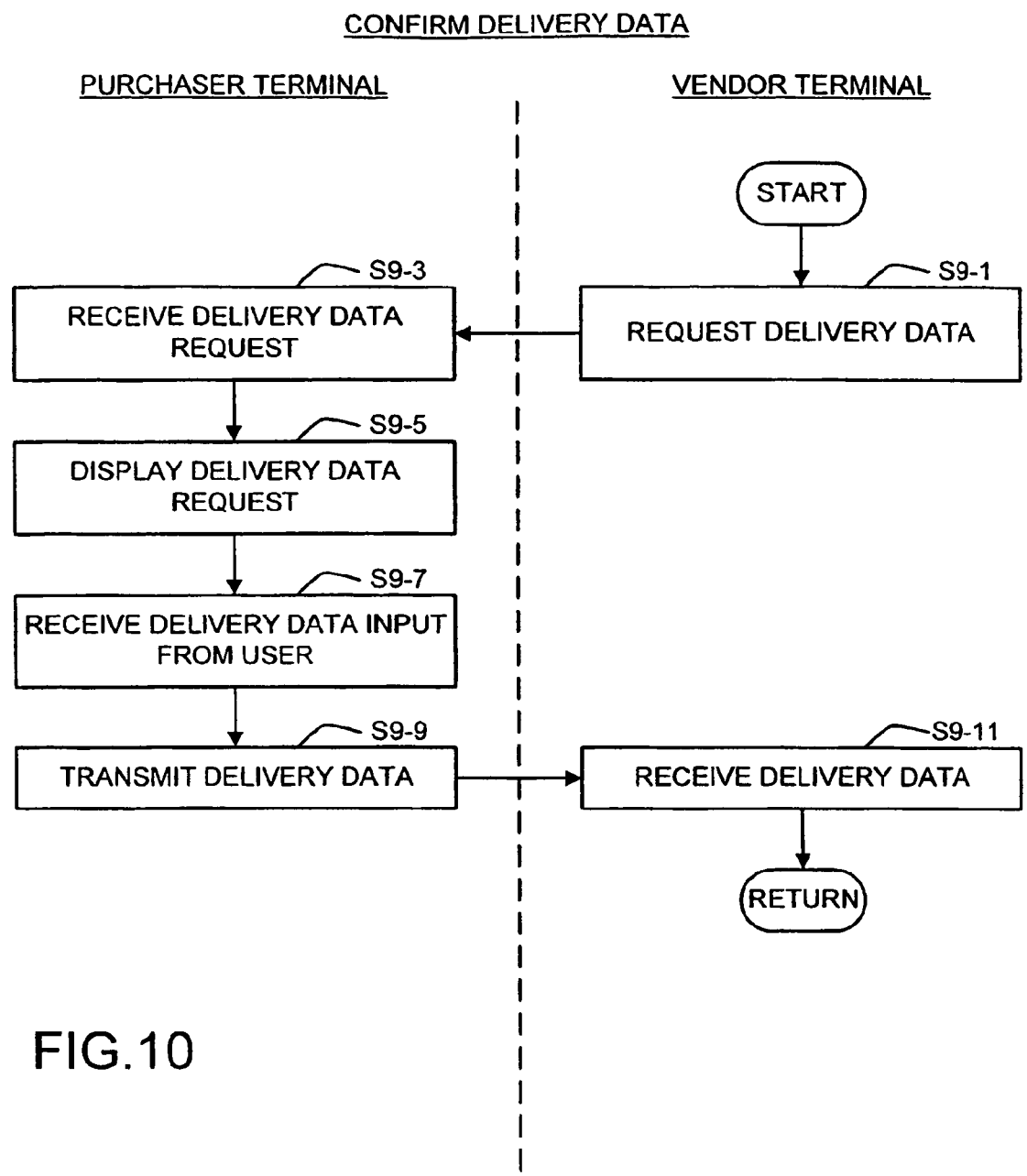
Figure 11A:
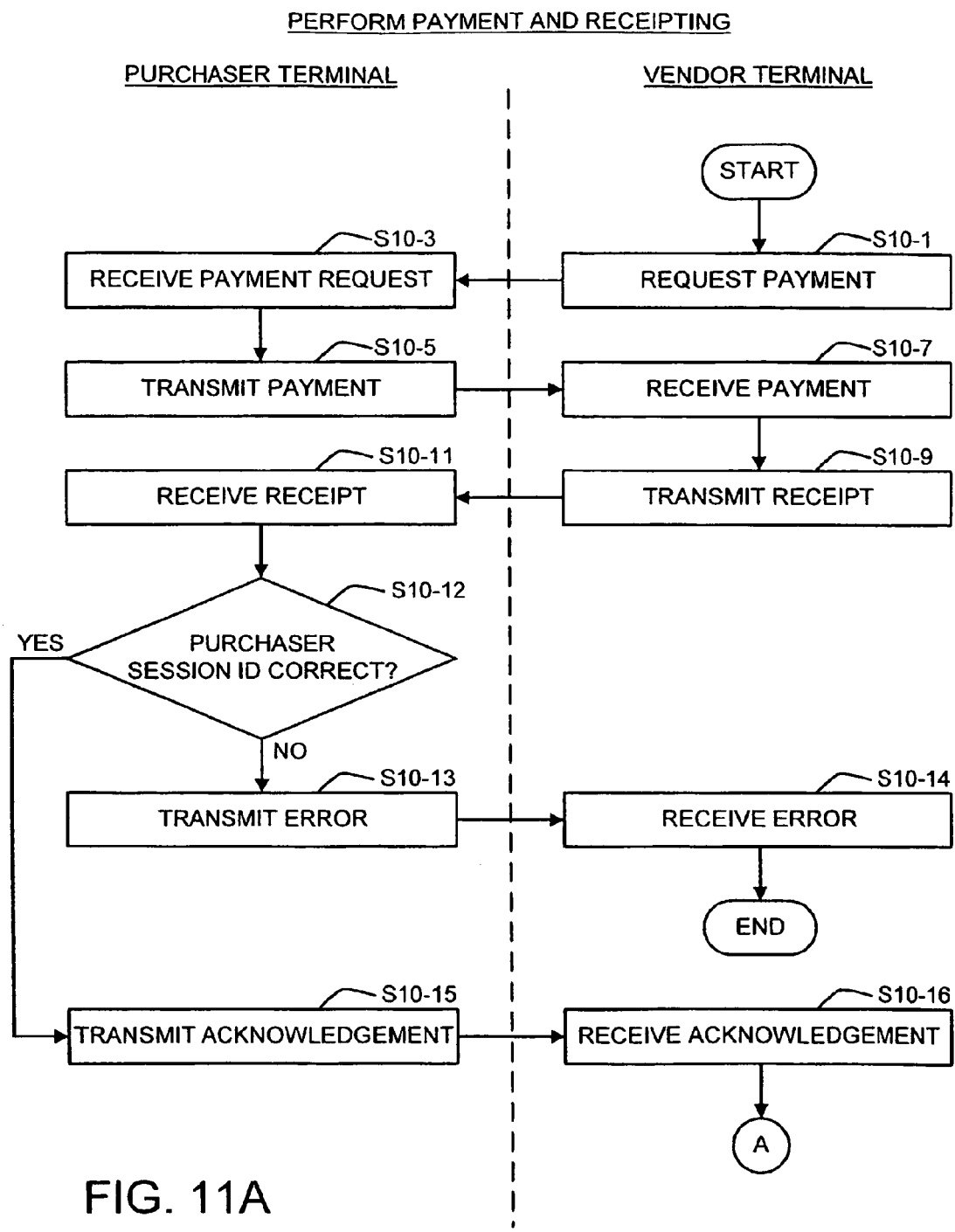
Figure 11B:
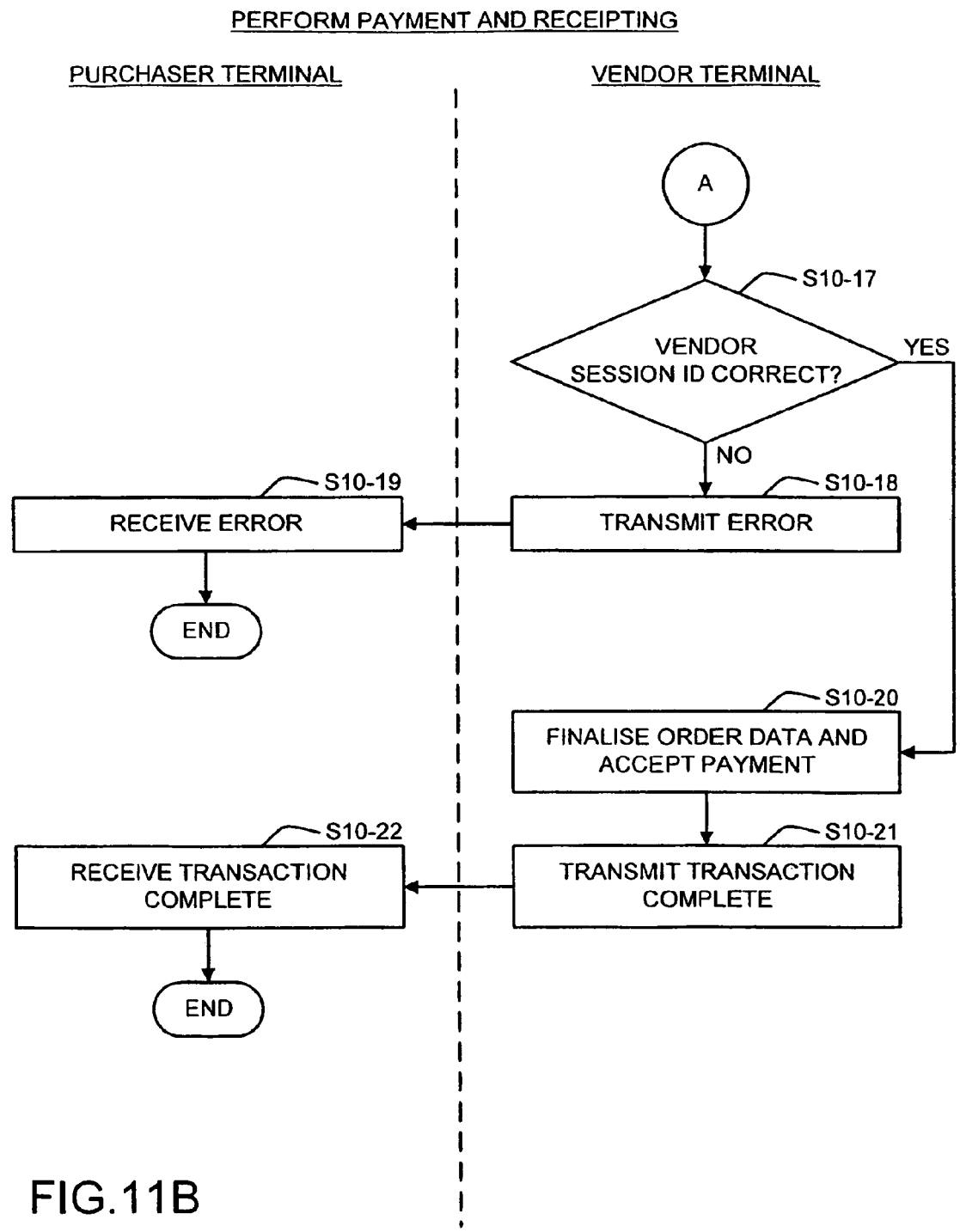
Figure 12A:
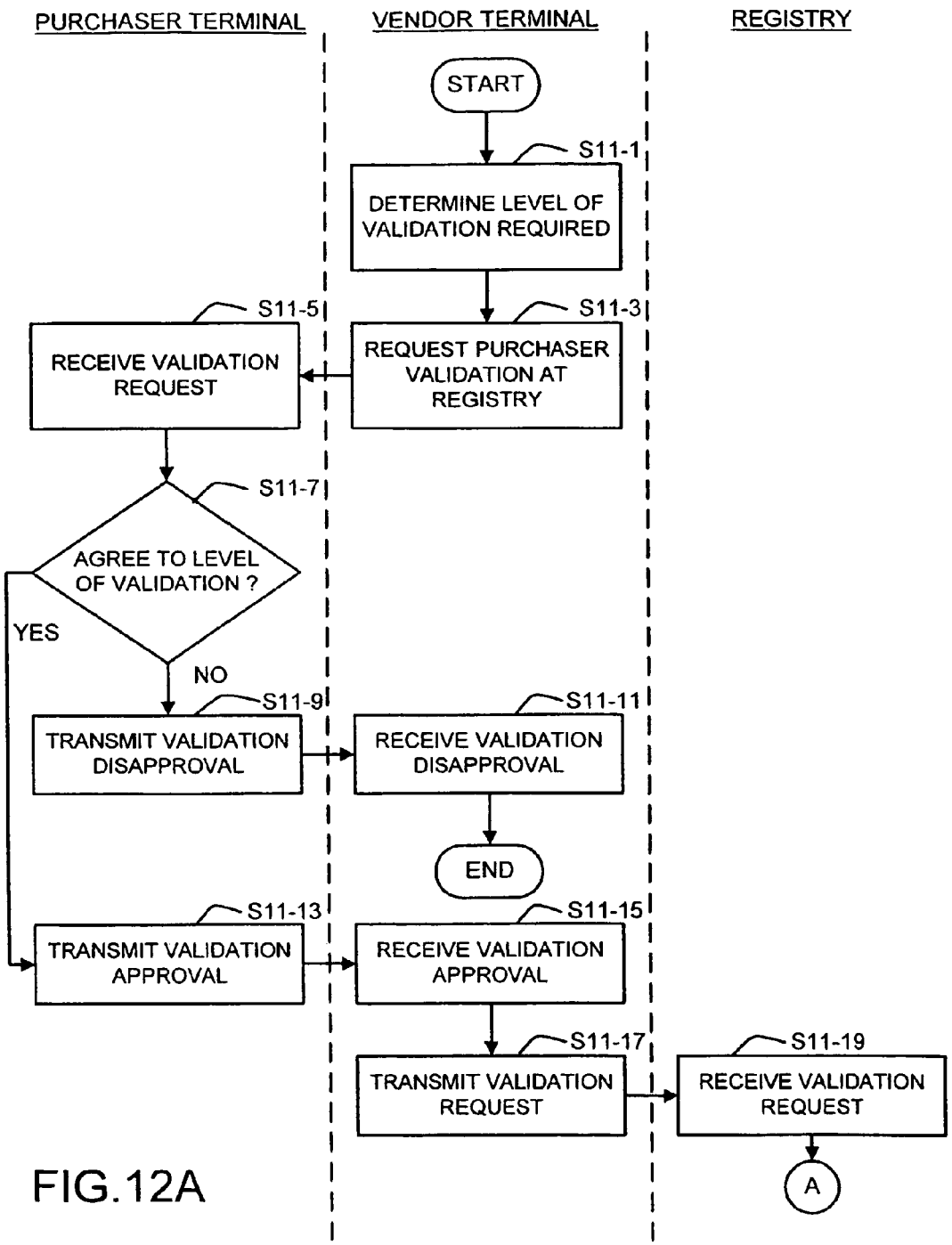
Figure 12B:
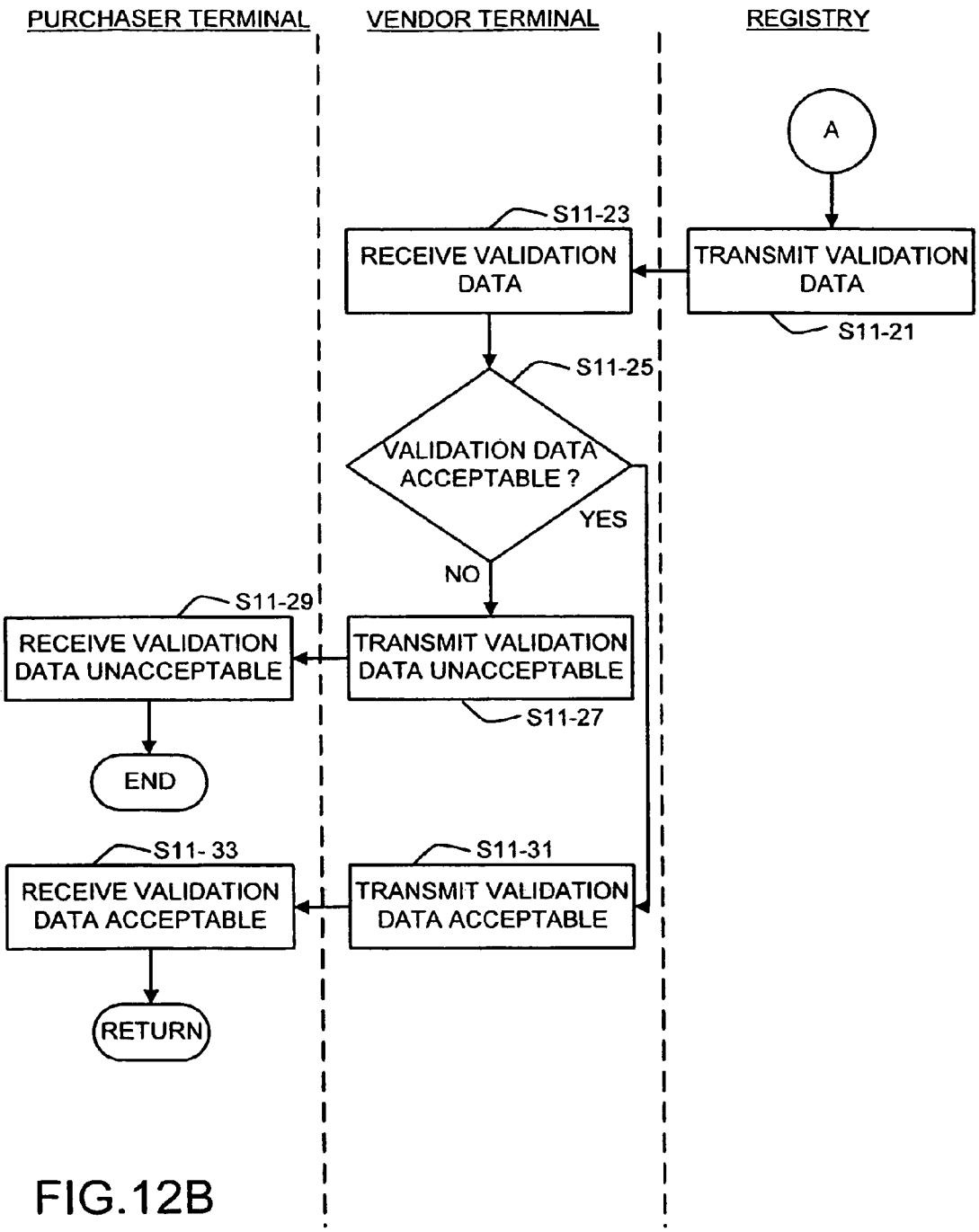
Figure 13:
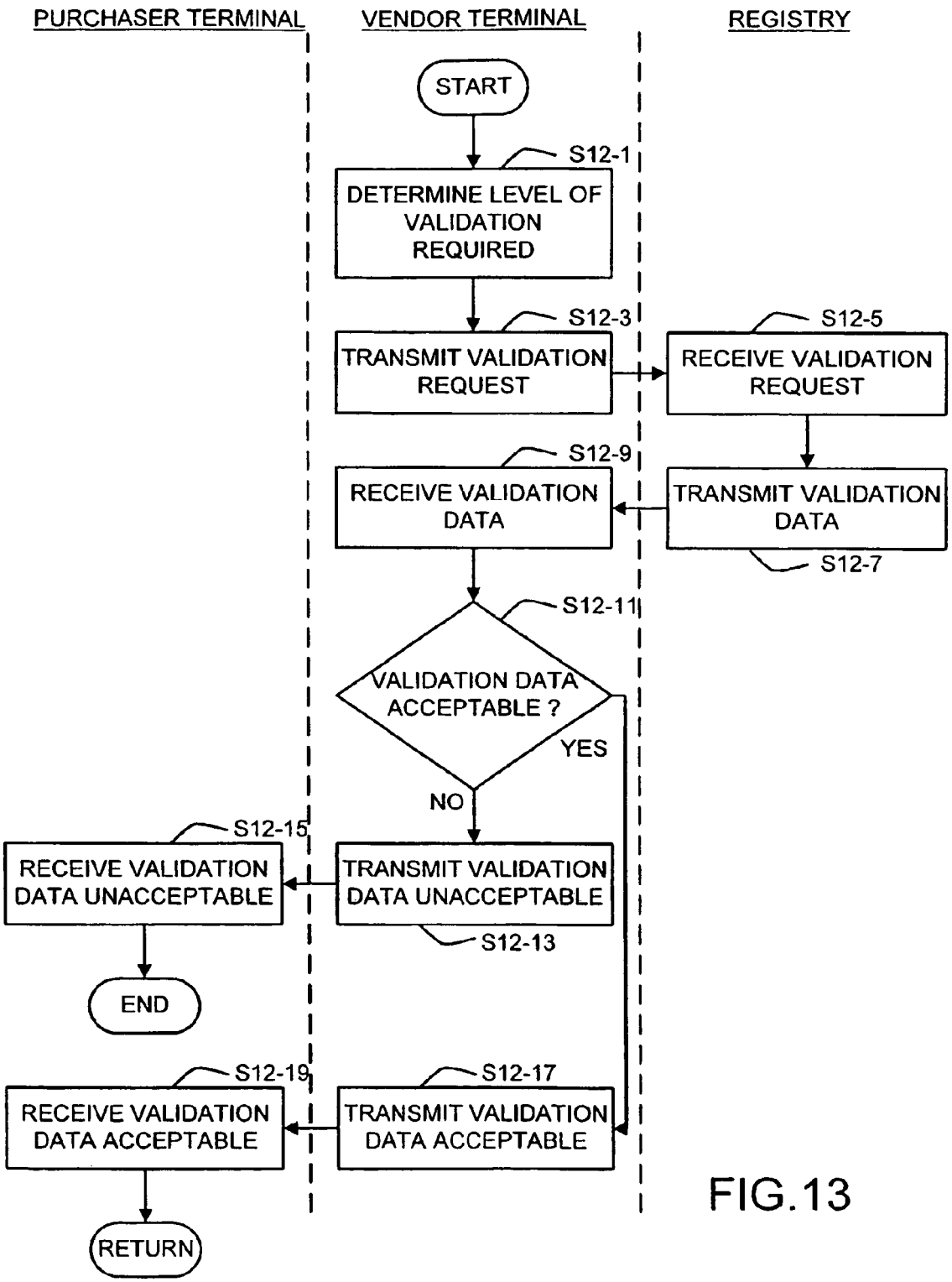
Figure 14A:
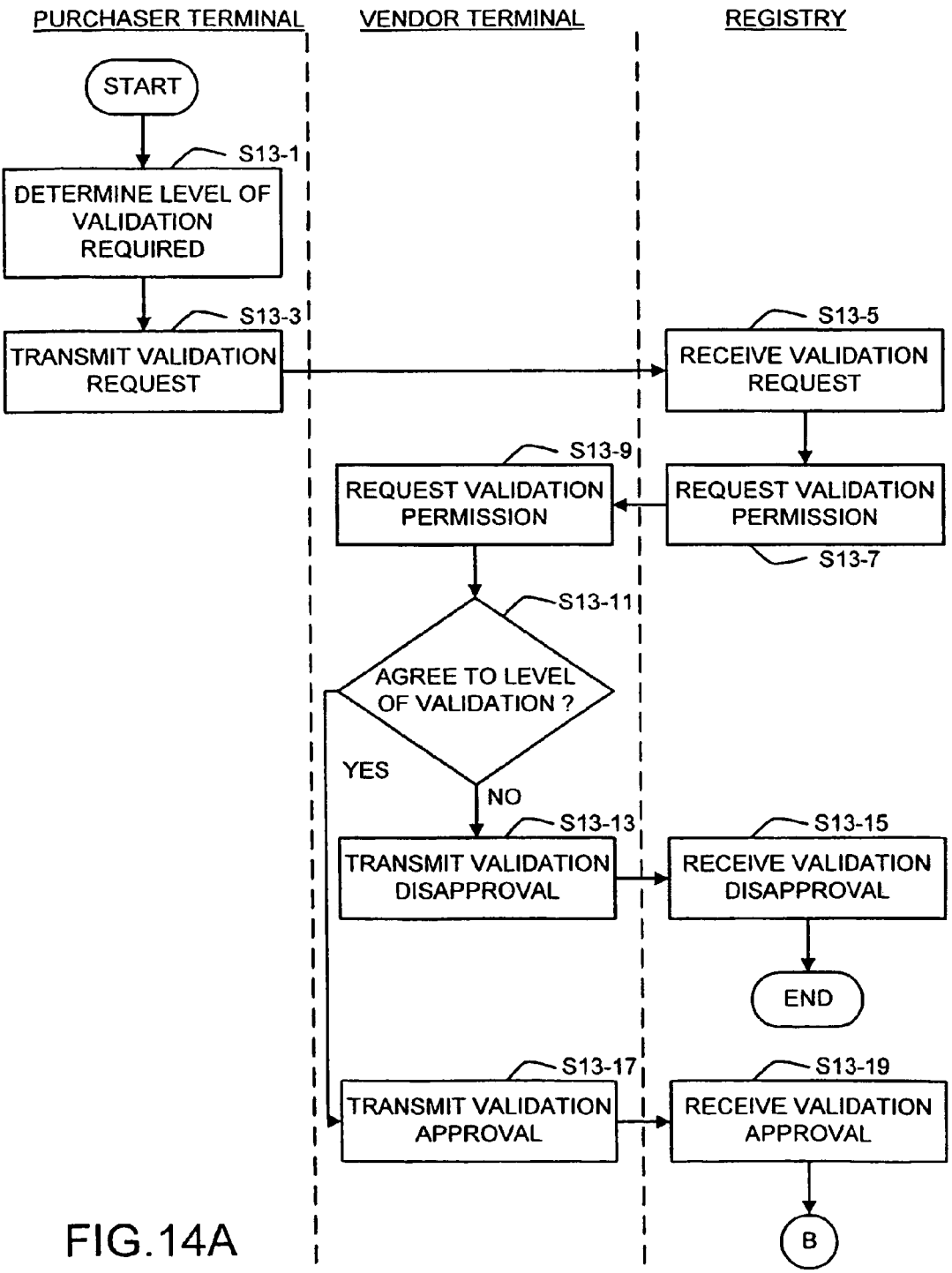
Figure 14B:
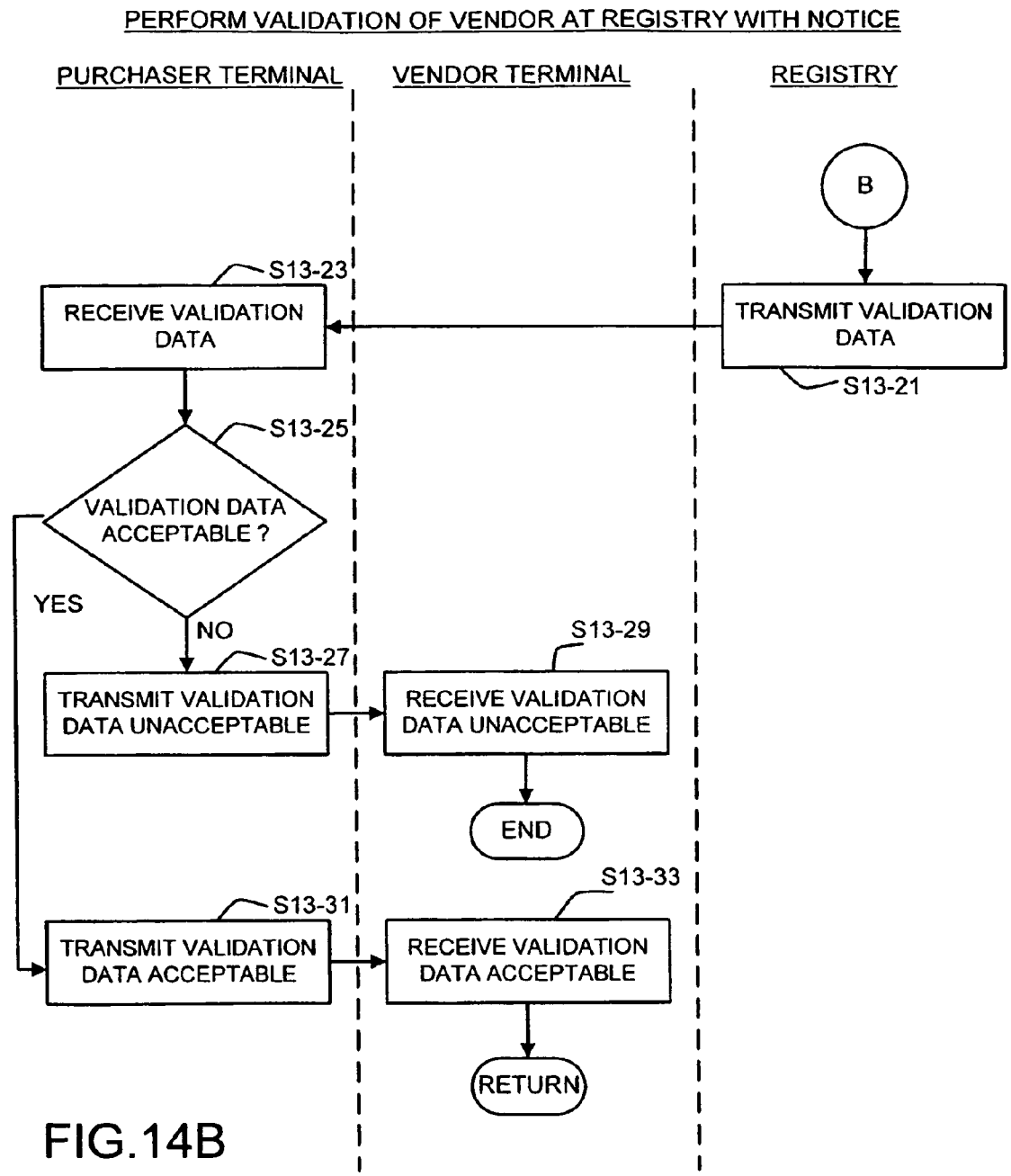
Figure 15:
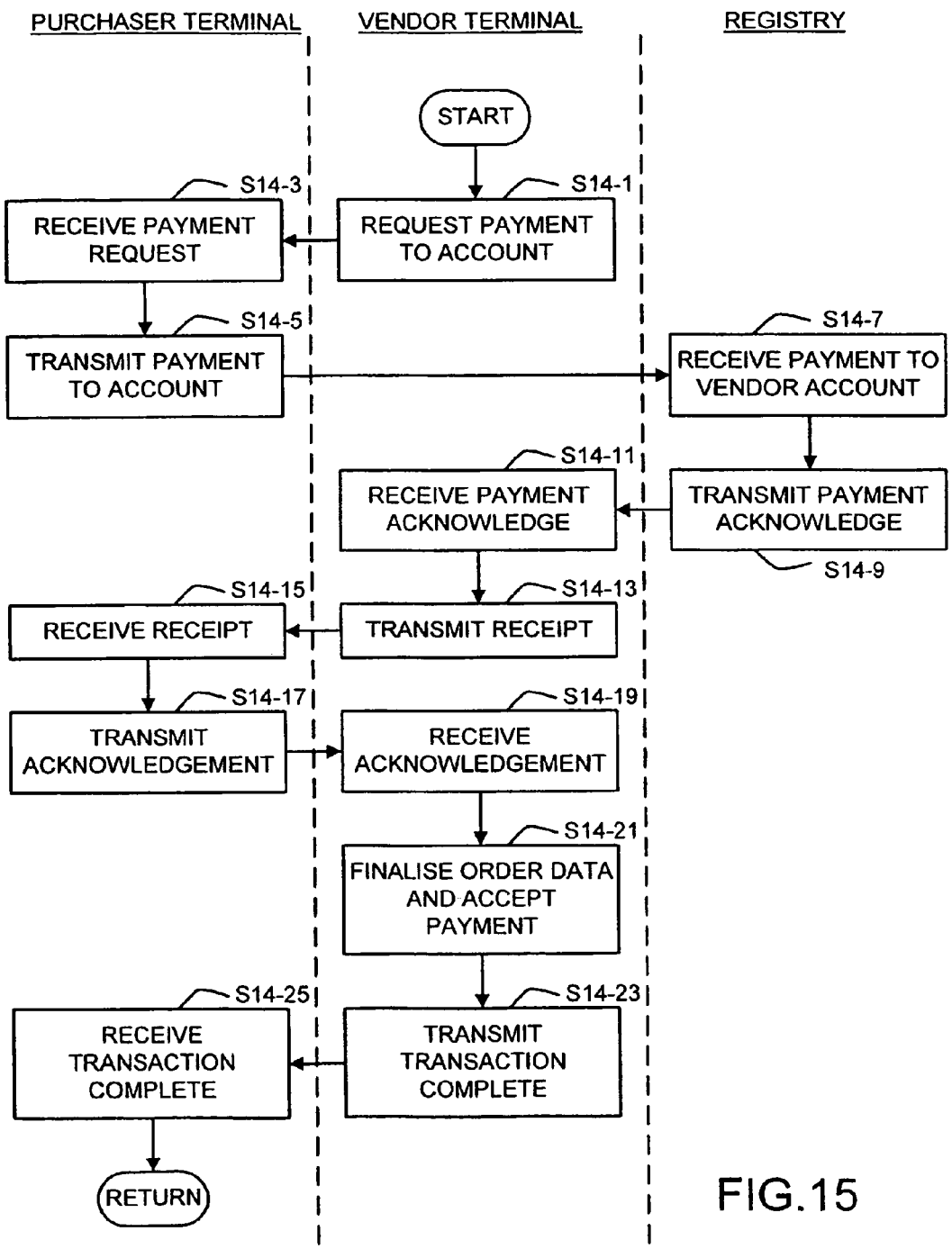
Figure 16:
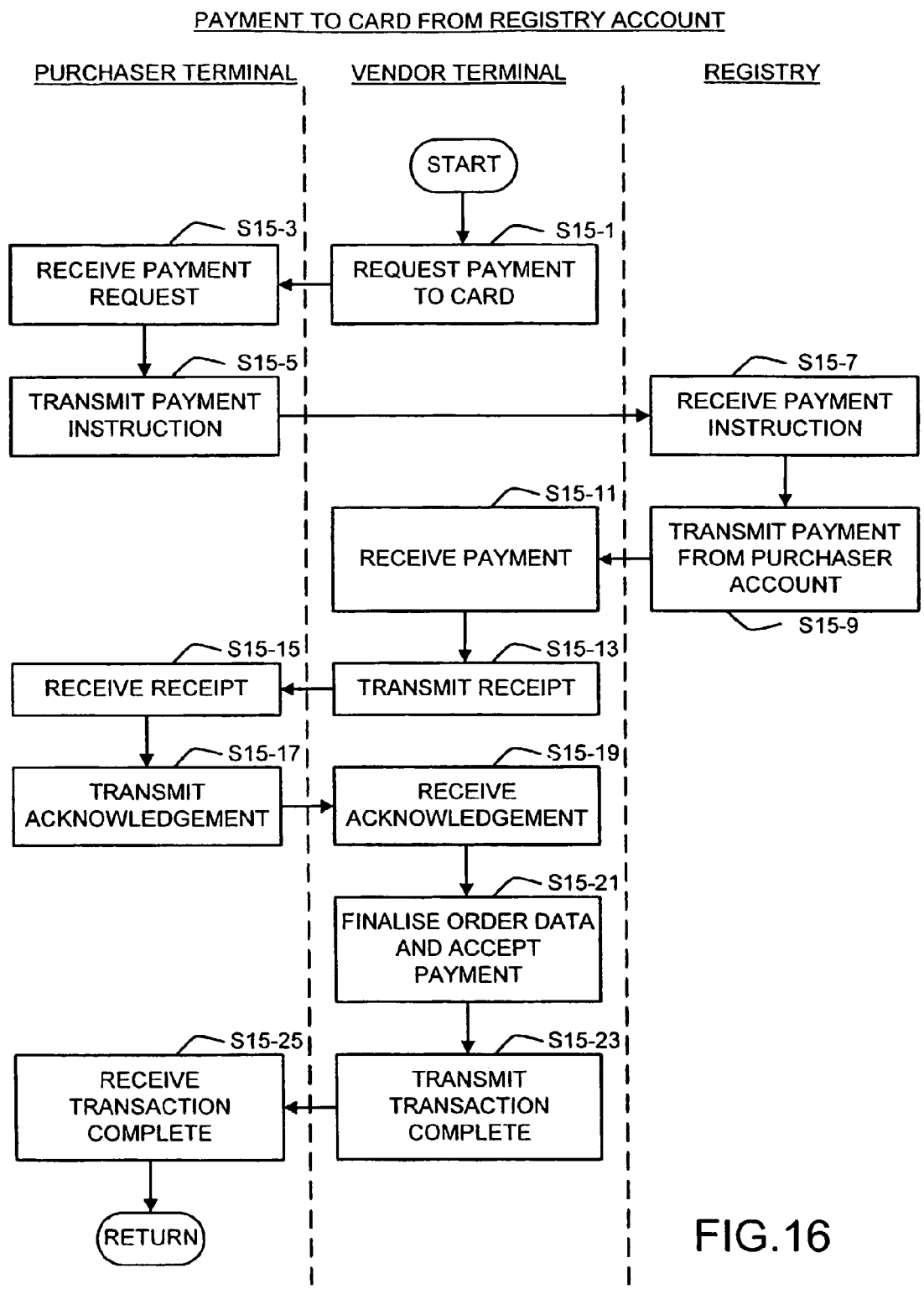
Figure 17:
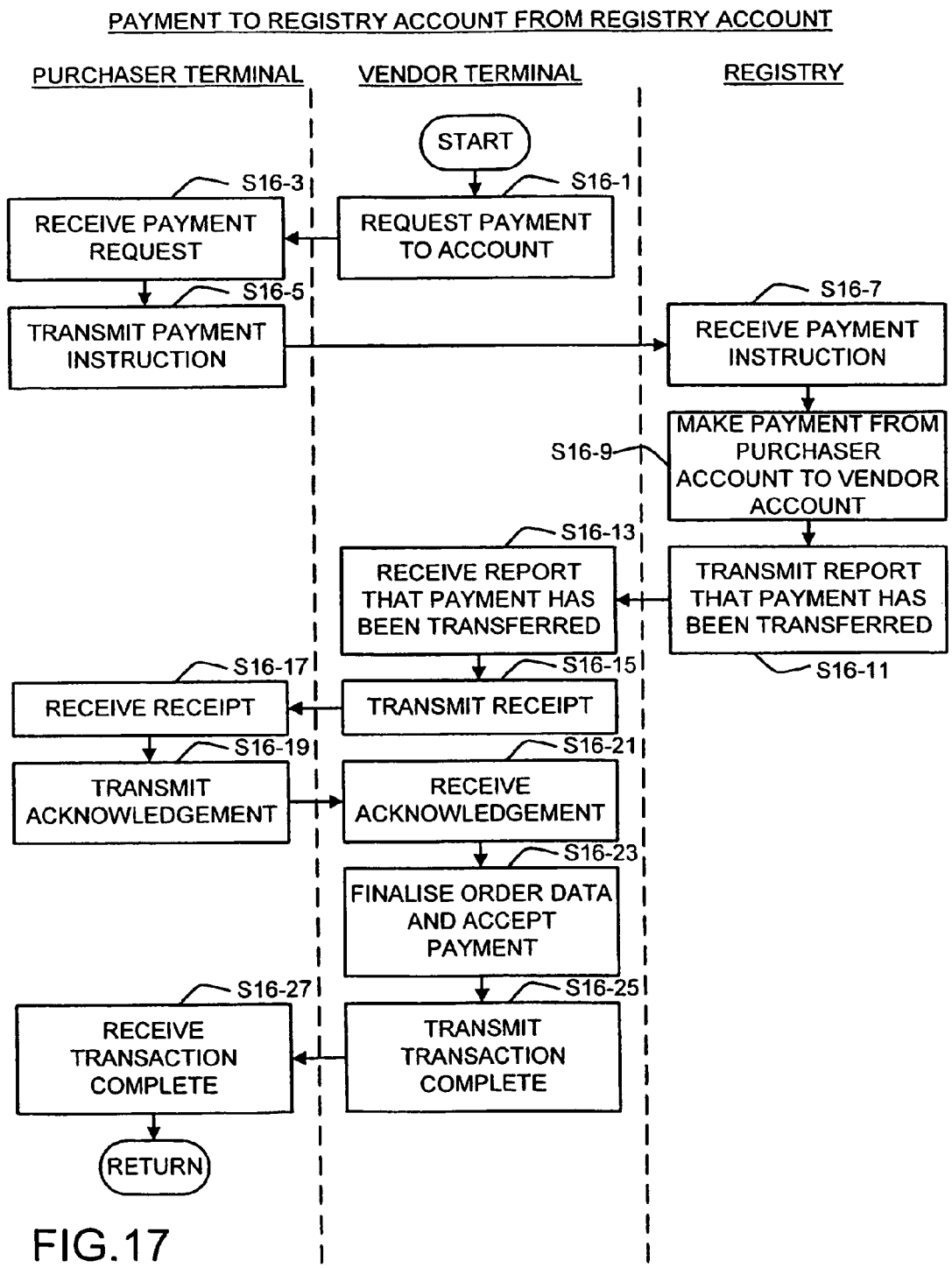
Figure 18A:
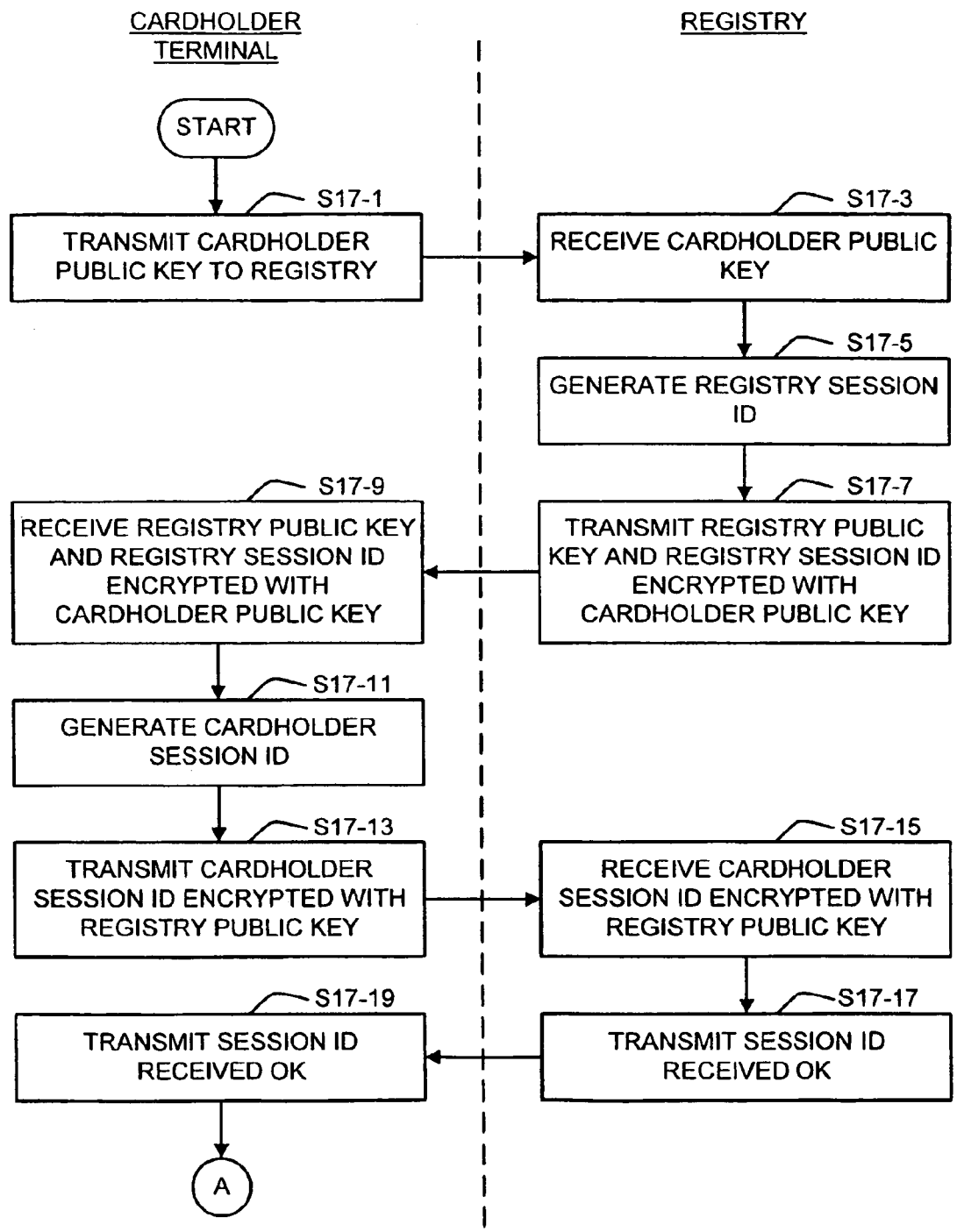
Figure 18B:
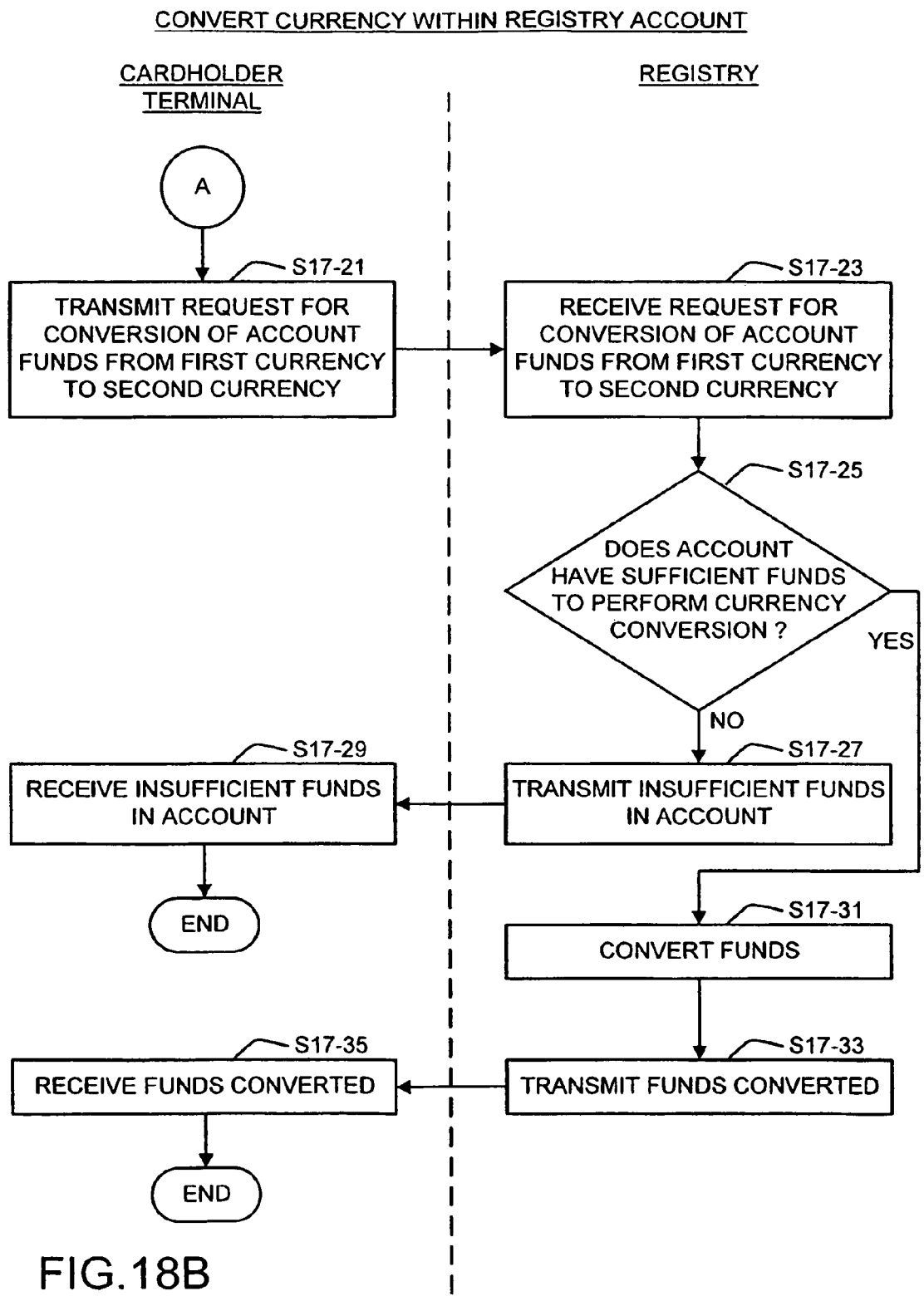
Figure 19:
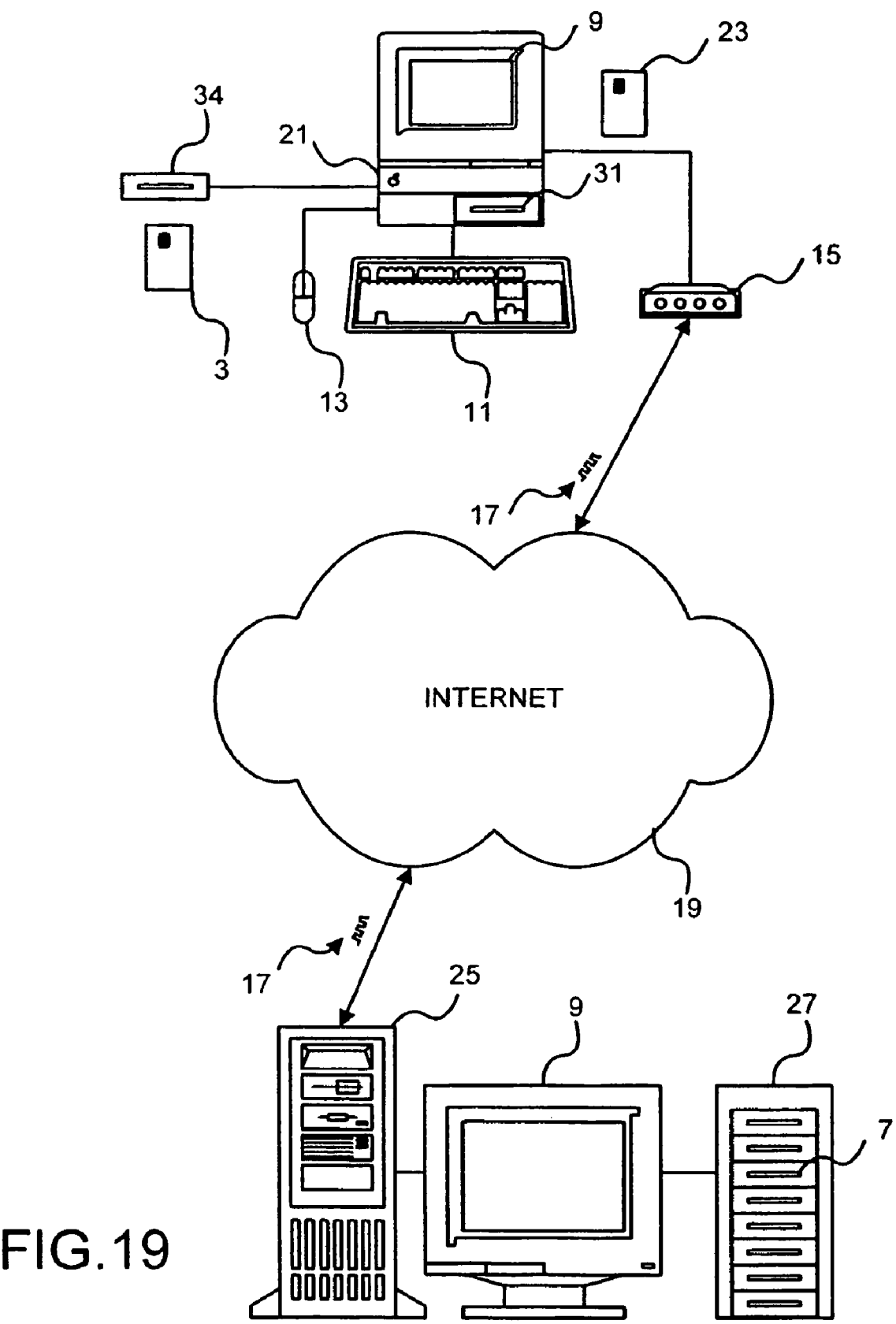
Figure 20:
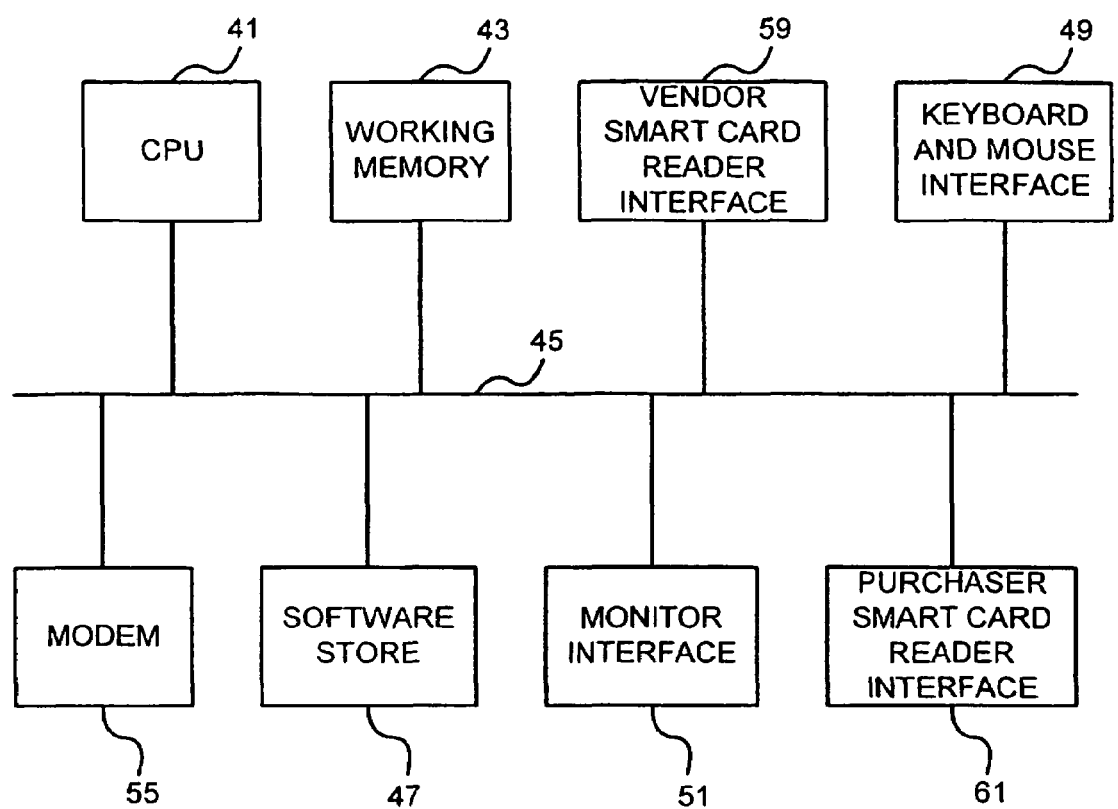

FIG. 7 which comprises FIGS. 7A and 7B is a flow diagram showing in more detail the processing steps involved in a secure link set-up step which forms part of the processing steps shown in FIG. 5;

FIG. 8 is a flow diagram showing in more detail the processing steps involved in a purchaser validation step which forms part of the processing steps shown in FIG. 5;

FIG. 9 is a flow diagram showing in more detail the processing steps involved in a vendor validation step which forms part of the processing steps shown in FIG. 5;

FIG. 10 is a flow diagram showing in more detail the processing steps involved in a delivery confirmation step which forms part of the processing steps shown in FIG. 5;

FIG. 11 which comprises FIGS. 11A and 11B is a flow diagram showing in more detail the processing steps involved in a payment and receipting step which forms part of the processing steps shown in FIG. 5;

FIG. 12 which comprises FIGS. 12A and 12B is a flow diagram showing in more detail the processing steps involved in a purchaser validation step which forms part of the processing steps shown in FIG. 5 according to an alternative embodiment;

FIG. 13 is a flow diagram showing in more detail the processing steps involved in a purchaser validation step which forms part of the processing steps shown in FIG. 5 according to a further alternative embodiment;

FIG. 14 which comprises FIGS. 14A and 14B is a flow diagram showing in more detail the processing steps involved in a vendor validation step which forms part of the processing steps shown in FIG. 5 according to another alternative embodiment;

FIG. 15 is a flow diagram showing in more detail the processing steps involved in a payment and receipting step which forms part of the processing steps shown in FIG. 5 according to another alternative embodiment;

FIG. 16 is a flow diagram showing in more detail the processing steps involved in a payment and receipting step which forms part of the processing steps shown in FIG. 5 according to another alternative embodiment;

FIG. 17 is a flow diagram showing in more detail the processing steps involved in a payment and receipting step which forms part of the processing steps shown in FIG. 5 according to a further alternative embodiment;

FIG. 18 which comprises FIGS. 18A and 18B is a flow diagram showing the main processing steps required to convert currency on an account card;

FIG. 19 shows an internet enabled face-to-face retail environment in which the present invention may operate;

FIG. 20 is a block diagram showing the main functional elements of a retailer terminal shown in FIG. 19.

OVERVIEW

In the following description it is assumed that the purchaser's terminal is already connected to the internet, as is the vendor's terminal. Also, using his or her terminal, the purchaser has browsed the vendor's website and has selected a product or products that he or she wishes to purchase.

Figure 1:
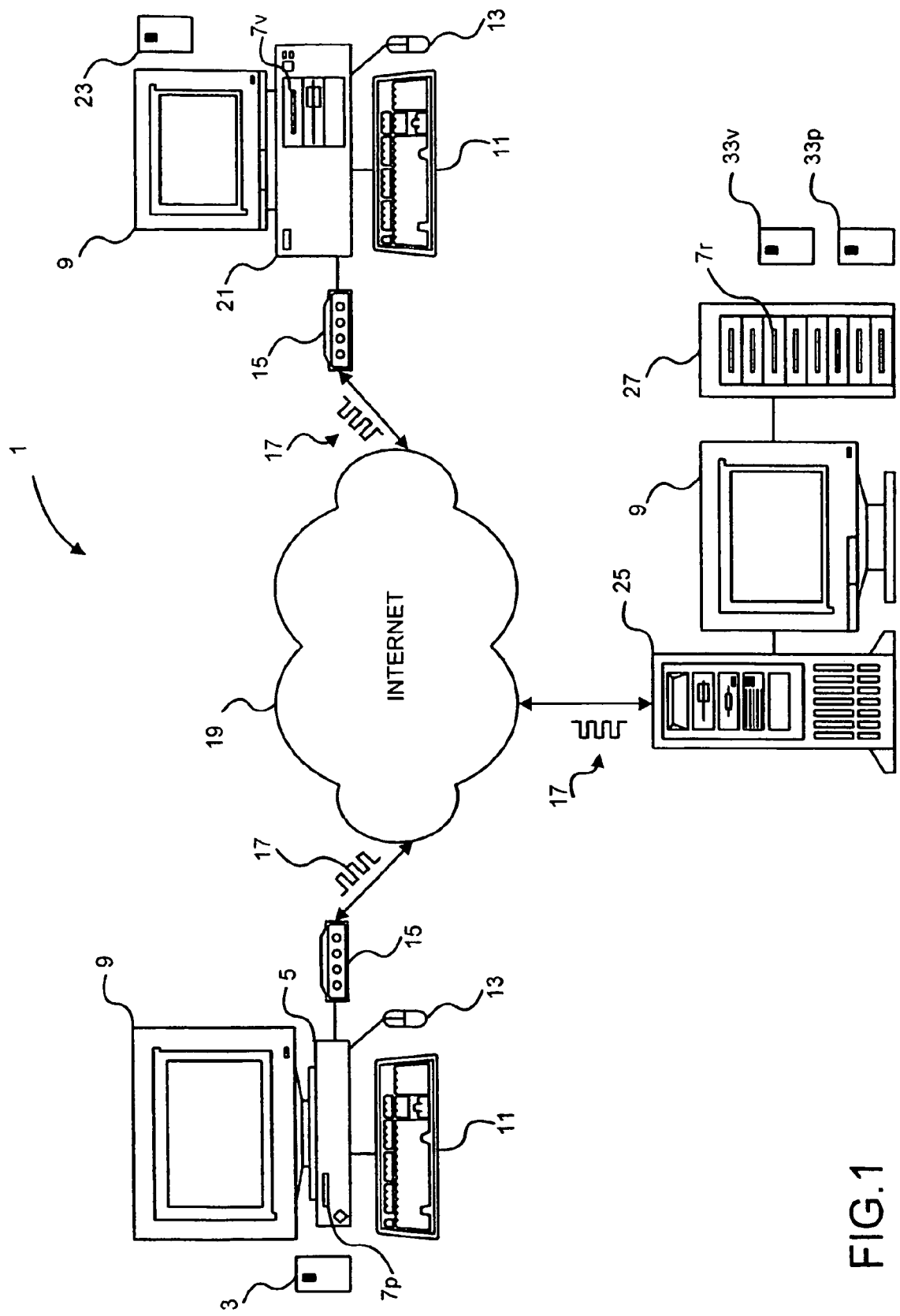
FIG. 1 shows an internet enabled computing environment in which the present invention may operate.

Referring to FIG. 1, the internet enabled computing environment 1 in which the payment system of the present embodiment is operated, comprises a purchaser terminal 5, a vendor terminal 21 and a registry terminal 25 which communicate electronically with one another via a network such as the internet 19. Attached to the purchaser terminal 5 is a smart-card slot $7_p$ into which a purchaser smart-card 3 may be inserted. In this embodiment, the purchaser smart-card 3 must be inserted into the smart-card slot $7_p$ in order for any transaction to be made with a vendor. Also attached to purchaser terminal 5 is a monitor 9 for displaying data to a user, a keyboard 11 and a mouse 13 which provide a user interface to the purchaser terminal 5 and a modem 15 for communicating via the internet 19. An electrical, electromagnetic or optical signal 17 is transmitted from and received by modem 15 in order to facilitate communication via the internet 19.

As shown in FIG. 1, the vendor terminal 21 also includes a monitor 9, a keyboard 11, a mouse 13, a modem 15 and a smart-card slot $7_v$ for receiving a vendor smart-card 23.

Attached to the registry terminal 25 is a registry smart-card server 27 having a plurality of registry account smart-cards permanently inserted in card slots $7_r$, therein. In this embodiment, there is typically one registry account logical smart-card for each user of the payment system, although in practice many such logical smart-cards will be grouped onto one master smart-card which will substantially reduce the smart-card and smart-card reader requirement at the registry. Each registry account is represented by a logical record on a master account card. The number of master account cards will be equal to the number of accounts divided by the number of logical account records on each card. Since the information on the card need only contain an account number and balance, with further information held in a connected hard disk at the registry 25, there could be as many as five thousand logical account records per master card.

In this embodiment, every registry account is represented by a disk based record at the registry 25. As and when a registry account is to be accessed for whatever reason, key information is copied to a spare logical account slot in a master card, so that card to card working may take place. The number of master cards required will be just greater than the number of parallel transactions required to provide adequate performance. After a transaction is completed, the disk record is updated. The card record is retained until the logical account slot is required. This provides a form of caching to provide better performance for those actively using their smart-cards and registry. Typically, a retailer's account will be more active than a purchaser's account.

Figure 2:
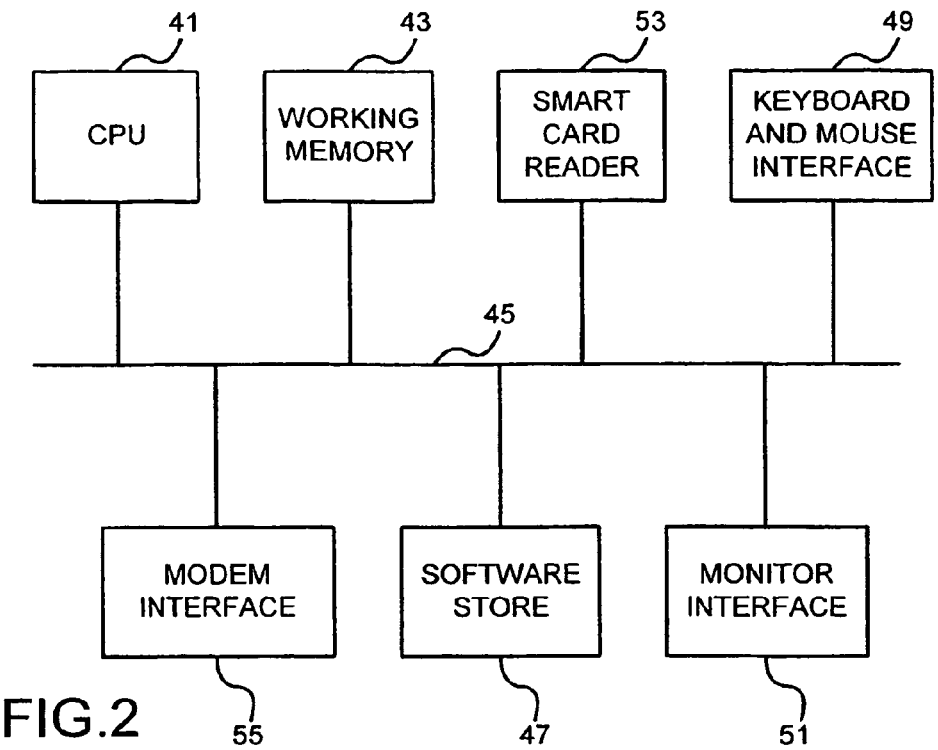
FIG. 2 is a block diagram showing the main functional elements of a vendor terminal and a purchaser terminal shown in FIG. 1.

FIG. 2 shows the functional elements of the purchaser terminal 5 and the vendor terminal 21. As shown, these terminals include a central processing unit (CPU) 41 which carries out processing operations in accordance with instructions stored in a working memory 43 and in accordance with user input received either via the keyboard and mouse interface 49 or the smart-card reader 53. The terminals also include a monitor interface 51 for interfacing to the display, a modem interface for interfacing with the modem 15 and a non-volatile software store 47 (such as a hard disk) which stores the processing instructions used to control the operation of the CPU 41 together with other data used by the terminals. As shown, these components are connected together via a bus 45.

Figure 3:
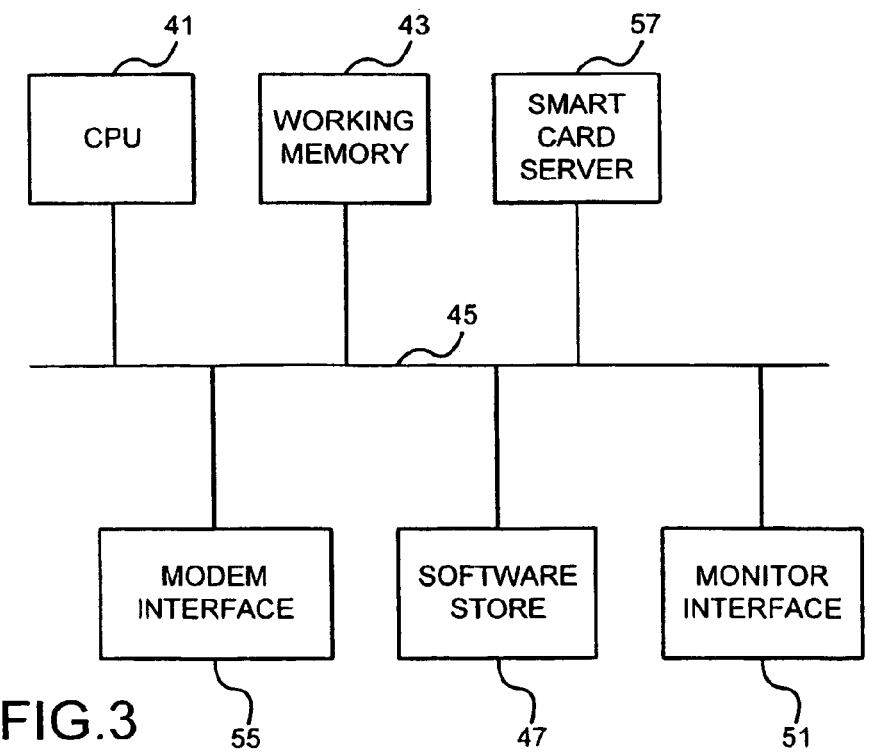
FIG. 3 is a block diagram showing the main functional elements of a registry terminal shown in FIG. 1.

FIG. 3 shows the functional elements of the registry terminal 25. As shown, the registry terminal 25 also includes a CPU 41, a working memory 43, a software store 47, a monitor interface 51 and a modem interface 55 which are all connected together by a bus 45. In addition, the smart-card server 27 is connected to the registry terminal 25 via a smart-card server interface 57.

Figure 4:
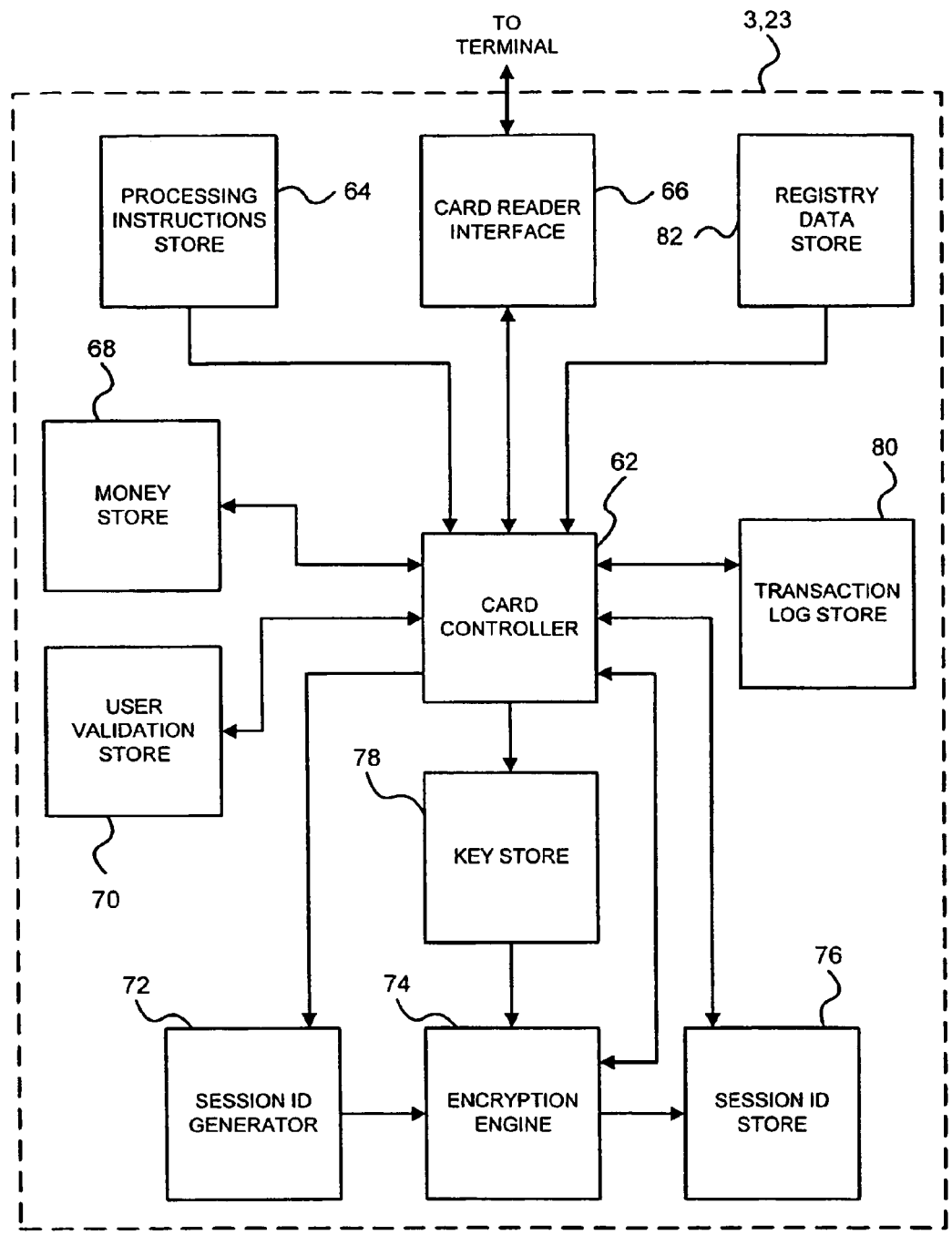
FIG. 4 is a block diagram showing the main functional elements of a smart-card shown in FIG. 1.

FIG. 4 shows the functional elements of a smart-card 3,23 used in this embodiment. As shown, the smart-card 3,23 includes a card controller 62 which carries out processing operations stored in a processing instructions store 64 in accordance with instructions received from the purchaser terminal 5, vendor terminal 21 or the registry terminal 25 via a card reader interface 66. Coupled to the card controller 62 is a money store 68, which holds data representing the amounts of money held on the smart-card 3,23. The smart-card 3,23 also includes a user validation store 70 which stores information about the smart-card owner such as the owner's name, age, address etc. When a smart-card 3,23 is used to make a transaction, a single unique session ID is generated by a session ID generator 72 on the smart-card 3,23. The generated session ID is encrypted by an encryption engine 74 also on the smart-card 3,23 and then stored in a session ID store 76. As will be described in further detail later, this session ID is appended to all subsequent messages related to the current transaction by the card controller 62, and the card controller 62 is also operable to compare the session ID of received messages to the stored session ID to check that the message belongs to the current transaction.

As shown in FIG. 4, the smart-card 3,23 further comprises a key store 78 for storing data needed for encryption and decryption, such as public and private keys, which will be described in more detail later. The key store 78 is coupled to the encryption engine 74, so that messages relating to a transaction can be encrypted by the encryption engine 74 using the stored encryption key data, before transmission back to the terminal via the card reader interface. Also coupled to the card controller 62 is a transaction log store 80 for storing data representing each transaction made using the smart-card 3,23 and a registry data store 82 for storing details of the user account held at the registry.

Referring now to FIG. 5, there are shown the principal functional steps which must be performed to complete a purchase transaction using the payment system of the present embodiment. As shown, at step S4-1, the user, having selected a desired product already, provides input indicating a product selection to the purchaser terminal 5. The purchaser terminal 5 then communicates with the vendor terminal 21 by transmitting signals 17 between the modems 55 attached to each of the purchaser terminal 5 and the vendor terminal 21 via the internet 19. The purchaser terminal 5 transmits the product selection to the vendor terminal 21, which then returns price and delivery terms to the purchaser 5. The terms are then displayed by the purchaser terminal 5 on monitor 9 and the purchaser terminal 5 then awaits an input from the purchaser to indicate approval or disapproval of those terms via the keyboard 11 or mouse 13. The inputted approval or disapproval is then communicated by the purchaser terminal 5 to the vendor terminal 21 via the internet.

Next, at step S4-3, the purchaser smart-card 3 inserted in the purchaser terminal 5 and vendor smart-card 23 inserted in the vendor terminal 21 create and exchange secure encryption keys (which are stored in the respective key stores 78 of the purchaser and vendor smart-cards 3,23) to be used throughout the payment session and to be used as the basis for the secure exchange of information using data encryption between terminals. Before payment is made, however, in this embodiment the smart-cards 3,23 return control to the terminals so that user validation can be performed. This is initiated at step S4-5, where the vendor terminal 21 displays on monitor 9 a request for user input to indicate whether validation of the purchaser should be undertaken. Such input is received via the keyboard 11 or mouse 13. If validation is to be undertaken, processing proceeds to step S4-7 where validation is performed. To perform validation, as will be described in more detail below, the vendor terminal 21 communicates with purchaser terminal 5 or the registry 25 via the internet 19 to request identifier data about the purchaser so that certain pre-specified levels of knowledge about the purchaser are obtained.

Following purchaser validation, or if purchaser validation is not to be undertaken, the processing proceeds to step S4-9, where the purchaser's terminal 5 displays on monitor 9 a request for user input to indicate whether validation of the vendor should be undertaken. If vendor validation is required, then at step S4-11, validation of the vendor is performed, which is a similar process to that described above for purchaser validation. Following such validation, or if validation of the vendor is not required, processing continues at step S4-13. At this step, it is decided whether or not delivery of the product will be required. To determine whether delivery is required, the vendor terminal 21 analyses the delivery terms agreed at step S4-1. From these terms it will be clear whether anything is to be delivered. It is to be understood that delivery may include electronic transfer of data as well as postal delivery of physical items. If delivery is required, then the delivery data is confirmed at step S4-15 where the purchaser terminal transmits the relevant delivery address (which may be a postal address, an e-mail address or an FTP (file transfer protocol) server address for example) to the vendor terminal 21. Following this, or in the event that delivery is not required, control is passed back to the smart-cards 3,23 where payment and receipting is performed at step S4-17. In this step, the purchaser terminal 5 causes the appropriate value to transfer from the money store 68 of the purchaser smart-card 3 to the money store 68 of the vendor smart-card 23, during which a receipt message is transferred from the vendor smart-card 23 to the purchaser smart-card 3.

An overview of the smart-card payment system of this embodiment has been given above. The system offers a number of advantages, including:

i) the provision of a single session ID which links all messages in a transaction including the terms, user validation and payment, thereby inextricably linking the payment to the transaction;

ii) the provision of different levels of user (purchaser and/or vendor) validation; and iii) the provision of a third party registry for validation of one or more of the parties to a transaction if required.

These and other advantages of the payment system of the present embodiment will become apparent from the following more detailed description.

Product Selection

Figure 6:
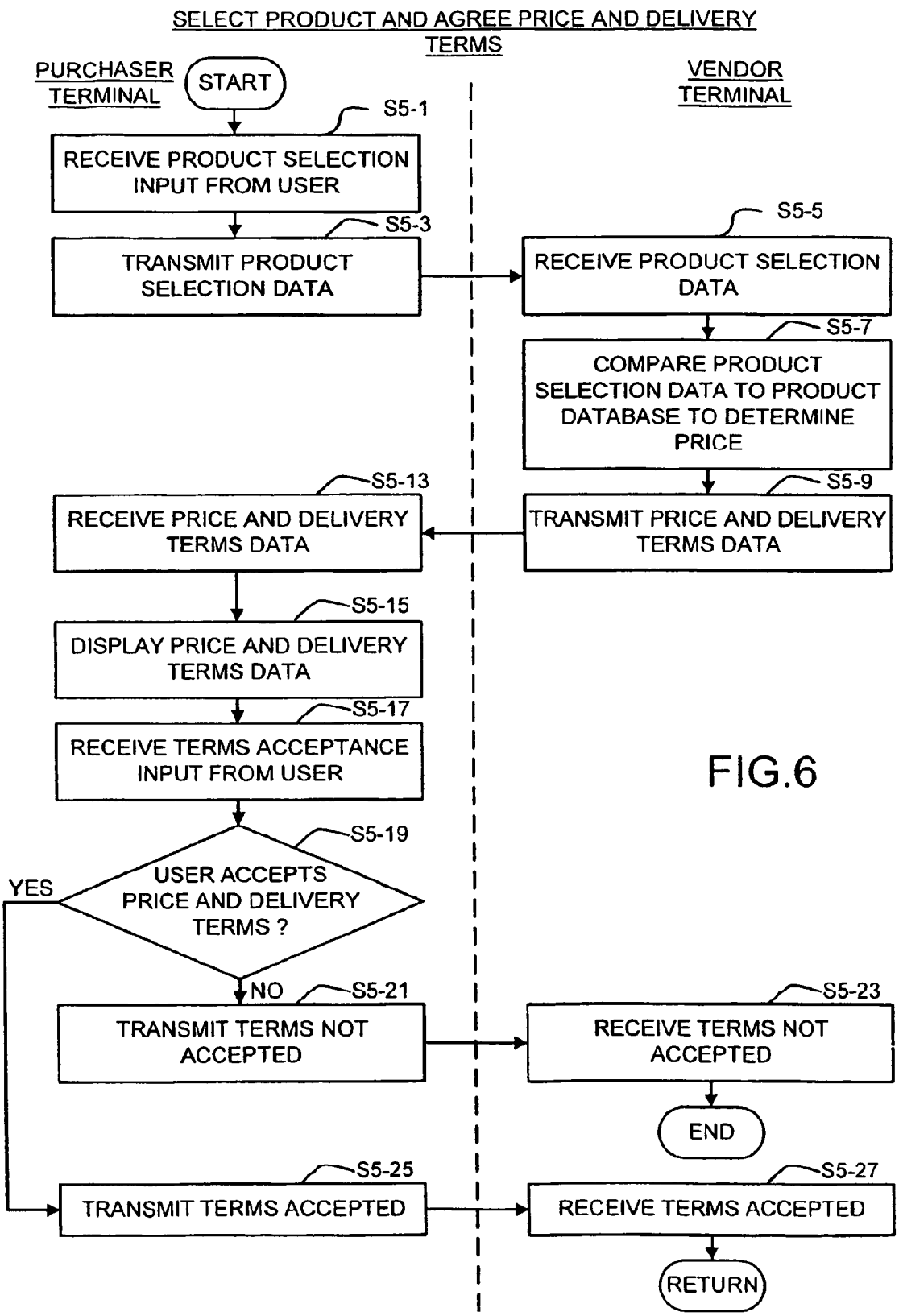
FIG. 6 is a flow diagram showing in more detail the processing steps involved in a product selection and price agreement step which forms part of the processing steps shown in FIG. 5.

FIG. 6 shows an expansion of step S4-1 in which the purchaser terminal 5 transfers data describing a product selection to the vendor terminal 23 and the purchaser and vendor terminals 5, 23 communicate to establish the price and delivery terms for the transaction. In FIG. 6, the steps undertaken by the purchaser's terminal are shown to the left hand side of the central dotted line and those steps undertaken by the vendor's terminal are shown on the right hand side of the central dotted line.

At step S5-1, the purchaser terminal 5 receives product selection input from the user via the keyboard 11 or mouse 13, and at step S5-3 product selection data is transmitted to the vendor terminal 21 by transmitting signals 17 from the modem 55 connected to the purchaser terminal 5 to the modem 55 connected to the vendor terminal 21 via the internet 19. The product selection data is received by the vendor terminal 21 at step S5-5. At step S5-7, the vendor terminal 21 compares the product selection data to a product database to determine the price of the product and at step S5-11 the price and any necessary delivery terms data are transmitted to the purchaser terminal 5. At step S5-13 the purchaser terminal 5 receives the price and delivery terms data, which data is then displayed to a user at step S5-15. The purchaser terminal 5 then receives acceptance input from the user at step S5-17 and at step S5-19 the terminal 5 processes the input from the user to determine whether the user accepted the price and delivery terms. If the price and delivery terms are not accepted, then at step S5-21 the purchaser terminal 5 transmits that the terms are not accepted to the vendor terminal 21 which is received at step S5-23. The transaction process then ends. If the user does accept the price and delivery terms, then at step S5-25 the purchaser terminal 5 transmits that the terms have been accepted and at step S5-27 the vendor terminal 21 receives that the terms have been accepted. Following this, the selection of product and agreement of price and delivery terms is complete and referring again to FIG. 5 processing then continues to step S4-3.

Establish Secure Link

The processing of step S4-3 is shown in more detail in FIG. 7. At step S6-1, the vendor terminal 21 transmits a request for the purchaser to identify how payment is to be made. At step S6-3, that request is received at the purchaser terminal 5 and at step S6-5 the purchaser terminal 5 transmits that the payment system of the present embodiment is to be used, ie payment using the smart-cards 3,23. This is received at step S6-7 by the vendor terminal 21.

Once it has been established that the payment system of the current embodiment is to be used, control passes to the smart-cards 3,23 which establish a secure session between themselves. This is achieved, in this embodiment, using so called public key encryption where each party transmits to the other a public key with which data should be encrypted. It is only possible to decrypt the encrypted data using a private key which is retained by each party. The present embodiment uses a modified public key encryption scheme which allows a new, unique session ID to be used for each transaction in connection with the asymmetric key pair.

Setting up the secure session begins at step S6-9 where the vendor smart-card 23 transmits its public key from its key store 78 to the purchaser smart-card 3. The purchaser smart-card 3 receives the public key from the vendor smart-card 23 at step S6-11 and stores it in its key store 78. Next, at step S6-13, the purchaser smart-card 3 generates, using the session ID generator 72, a purchaser session ID which it appends to all communications transmitted to the vendor smart-card 25 during the current session. In the present embodiment, the purchaser session ID takes the form of a block of data made up of a time stamp, a random number, a terminal ID and a card ID, all encrypted using the purchaser smart-card's public key (so that only the purchaser smart-card 3 can decrypt the purchaser session ID). Then at step S6-15, the purchaser smart-card 3 encrypts the purchaser session ID using the vendor smart-card's public key and transmits this to the vendor smart-card 23, along with its own public key. At step S6-17, the vendor smart-card 23 receives and decrypts the data to recover the purchaser session ID and the purchaser public key, which it stores within the session ID store 76 and the key store 78 respectively of the vendor smart-card 23. Next, at step S6-19, the vendor smart-card 23 generates a vendor session ID using its session ID generator 72. In the present embodiment, the vendor session ID comprises a time stamp, a random number, a terminal ID and a card ID, all encrypted using the vendor smart-card's public key (so that only the vendor smart-card 23 can decrypt the vendor session ID). At step S6-21, the vendor smart-card 23 then encrypts the vendor session ID using the purchaser smart-card's public key and transmits it to the purchaser smart-card 3. At step S6-23, the purchaser smart-card 3 receives and decrypts the data to recover the vendor session ID which it stores in its session ID store 76. At step S6-25, the purchaser smart-card 3 transmits a message to the vendor smart-card 23 stating that the vendor session ID has been received, which message is received by the vendor smart-card 23 at step S6-27.

The session ID generated by each of the purchaser smart-card 3 and the vendor smart-card 23 will be different for a given session (because of the time stamp and the random number), but they will be inextricably linked to the one session smart-cards and the two smart-cards. In present embodiment, the session IDs are added to every transfer of data passing between the terminals after it has been established that the payment system of the present embodiment is to be used. This will take the form of appending both session IDs to the end of the message and then encrypting the whole with the recipient's public key. By performing the encryption each message is protected from being read by an unauthorized party, and by using the session ID each message is digitally signed to certify that the sender of the data is who they claim to be and that the message is valid. It should be noted that only the purchaser smart-card 3 and the vendor smart-card 23 will be able to: validate the session IDs, encrypt data and decrypt data. The cards will use their own encryption engines 74 for this purpose, rendering it unnecessary for the terminals to be secure devices.

Part of the session will include the transmission of a user input such as acceptance or refusal of validation information supplied and/or delivery data. This will be entered as plain text (i.e. unencrypted and uncoded) by the vendor or purchaser and then passed to the local smart-card for appending of session IDs, encryption and transfer to the other party. Again, it is not necessary for the terminal to be a secure device.

Purchaser Validation

Referring now to FIG. 8, the processing steps to perform the validation of a purchaser (step S4-7) will now be described.

First, the vendor or vendor terminal 23 must determine the level of validation required at step S7-1. Note that if it is determined at step S4-5 that no validation is required, then the processing steps shown in FIG. 8 will not be undertaken. In this embodiment, the level of validation may be selected manually by the vendor, in which case validation options will be displayed by the vendor terminal 21 on monitor 9 and which will then await an input from the vendor via the keyboard 11 or the mouse 13. Alternatively, the level of validation may be selected by the vendor terminal automatically, in which case the characteristics (eg value, nature etc) of the transaction will be compared to a predetermined set of rules for deciding the level of validation required.

Once the level of validation has been determined, the vendor terminal 21 will transmit a request for the purchaser validation at step S7-3 indicating the level of validation required. In the present embodiment, it is assumed that a relatively low level of validation is required. Therefore the validation request is sent to the purchaser terminal 5, not the registry 25. At step S7-5, the purchaser terminal 5 receives the validation request and at step S7-7 transmits the requested validation data (which may either be input by the purchaser or is stored in the validation store 70 of the purchaser smart-card 3). At step S7-9 the vendor terminal 21 receives the validation data and at step S7-11 determines whether the validation data received is acceptable. This is done either automatically by comparing the received validation data with pre-stored data or manually by displaying the validation data to the vendor and awaiting confirmation from the vendor that it is acceptable. If the validation data is unacceptable then processing continues at step S7-13 where the vendor terminal 21 transmits to the purchaser terminal 5 that the validation data provided was unacceptable. This is received at step S7-15 by the purchaser terminal 5 and then the transaction process ends. Alternatively, if the validation data is acceptable, processing continues at step S7-17 where the vendor terminal 21 transmits to the purchaser terminal 5 that the validation data provided was acceptable and at step S7-19 the purchaser terminal 5 receives this. The validation of the purchaser is then complete and, referring again to FIG. 5, processing continues at step S4-9.

Vendor Validation

If it is decided at step S4-9 that validation of the vendor is required, as described above, then the steps shown in FIG. 9 are performed (step S4-11). The processing of FIG. 9 is substantially the same as the processing of FIG. 8, except that it is the purchaser terminal 5 requesting the validation data and the vendor terminal 21 transmitting it.

Thus at step S8-1, the purchaser terminal 5 determines the level of validation that is required in substantially the same manner as described above with reference to purchaser validation in FIG. 8, following which it transmits a vendor validation request either to the vendor terminal 21 or to the registry 25 at step S8-3. In the present embodiment it is assumed that a relatively low level of validation is required. Therefore the validation request is sent to the vendor terminal 21, not the registry 25. On receiving the vendor validation request at step S8-5, the vendor terminal 21 transmits, at step S8-7, the requested validation data (which may either be input by the vendor or is stored in the validation store 70 of the vendor smart-card 23).

Following receipt of the validation data by the purchaser terminal 5 at step S8-9, the purchaser terminal 5 determines at step S8-11 whether the validation data is acceptable. This is done either automatically by comparing the received validation data with pre-stored data or manually by displaying the validation data to the purchaser and awaiting confirmation from the purchaser that it is acceptable. If the validation data is decided to be unacceptable, then at step S8-13 the purchaser terminal 5 transmits to the vendor terminal 21 that the validation data is not acceptable and the vendor terminal 21 receives this at step SB-15 following which the transaction process terminates. If, however, the validation data is determined to be acceptable at step S8-11, then at step S8-17 the purchaser terminal 5 transmits to the vendor terminal 21 that the validation data is acceptable. This acceptance is received by the vendor terminal 21 at step S8-19 following which the validation of the vendor is complete and, referring again to FIG. 5, processing continues at step S4-13.

Confirm Delivery Data

If it is determined at step S4-13 that delivery is required, then the delivery data must be confirmed at step S4-15. This process is shown in more detail in FIG. 10.

At step S9-1, the vendor terminal 21 requests the delivery data, that is the delivery address (which may be a postal address or an e-mail address, for example) and the name of the person or company to whom the items should be directed. At step S9-3, the purchaser terminal 5 receives the delivery data request and displays on monitor 9, at step S9-5, a request for a user to enter delivery data. At step S9-7, the purchaser terminal receives the delivery data input from the user via the keyboard 11 or the mouse 13 and at step S9-9 transmits the delivery data to the vendor terminal 21. The vendor terminal 21 then receives the delivery data at step S9-11, following which the process of confirming delivery data is complete and, referring again to FIG. 4, the processing will continue at step S4-17.

Payment and Receipting

Performing payment and receipting (step S4-17) will now be described in greater detail with reference to FIG. 11. As mentioned above, control of the payment and receipting is carried out in this embodiment by the smart-cards 3,23.

Starting at S10-1, the vendor smart-card 23 transmits a request for payment to the purchaser smart-card 3. At step S10-3, the purchaser smart-card 3 receives the request and at step S10-5 transmits the payment data to the vendor smart-card 23. At step S10-7, the vendor smart-card 23 receives the payment data and at step S10-9 transmits a receipt for the payment. At this time, the vendor smart-card 23 has received the payment data but has not accepted the payment described therein. The purchaser smart-card 3 then receives the receipt at step S10-11. At step S10-12, the purchaser smart-card 3 validates the receipt by checking that the purchaser session ID has been appended to the receipt data and that it matches its purchaser session 1D stored in the session ID store 76. If the purchaser session ID is not present and correct, then at step S10-13, the purchaser smart-card 23 transmits an error message to the vendor smart-card 23 stating that the session ID is incorrect. This error message is received by the vendor smart-card 23 at step S10-14 following which the transaction process ends. On the other hand, if it is determined at step S10-12 that the purchaser session ID is present and correct, then at step S10-15 the purchaser smart-card 3 transmits an acknowledgement that the receipt has been received. This acknowledgement is received by the vendor smart-card 23 at step S10-16, following which the vendor smart-card 23 validates the acknowledgement by checking that the vendor session ID has been appended to the acknowledgement data and that it matches the vendor session ID stored in the session ID store 76. If the vendor session ID is not present and correct, then at step S10-18 the vendor smart-card 23 generates an error message stating that the vendor session ID is not present and transmits it to the purchaser smart-card 3 which receives the message at step S10-19 following which the transaction process ends. If on the other hand, however, it is determined at step S10-17 that the vendor session ID is present and correct, then processing continues at step S10-20 where the vendor smart-card 23 finalizes the order data and accepts the payment data, thereby actually receiving the payment, to complete the transaction. The receipt and acknowledgement are validated by each smart-card 3 and 23 to ensure the session remains intact. The transaction can only be completed if both smart-cards 3 and 23 complete this test successfully. Thus the payment process is inextricably linked to the purchase transaction, the validation of the parties and acceptance of all terms into a single transaction session including user input of validation acceptance and possible delivery details. Once the session has been validated as complete the vendor smart-card 23 transmits, at steps S10-21, a message to the purchaser terminal 5 to indicate that the transaction is complete. At step S10-22 the purchaser smart-card 3 receives the transaction complete message following which the transaction process terminates. Following completion of the transaction, the purchaser terminal 5 and smart-card 3 may then be used to perform other actions unconnected with the purchase.

Validation Level Determination

As described above, it is necessary to determine at step S7-1 and S8-1 the level of validation of the other party to a transaction that is required. For example, one party may wish to validate the address and other credentials (such as age, legal status or credit worthiness) of the other party and also to be guaranteed that purchased goods will be delivered intact and possibly to a given quality. As discussed above, some of this information, such as name, age or address, is held in the validation store 70 on the smart-card of the user and this information plus further information may be held by the registry 25. Either party may opt for more or less information from the registry 25, and/or a greater or lower level of guarantee. The registry 25 may implement a charging structure to enable users of the payment system to be charged for information held by and requested from the registry 25, or to charge users for storing and providing their data to others. Different levels of payment will be required depending on the amount of validation data held by the registry.

In all trades made using the payment system of the present invention, the complete trade, that is selection of goods, agreement to purchase, payment and subsequent expected delivery are based on the honesty of the two parties and their acceptance of each other's bona fides and mutual acceptance of the terms of trading. The payment system does not apply any specific trading rules of its own and it is up to both parties to agree on terms that overcome any doubts a party may have regarding the other party and the trade. The payment system provides electronic packaging of a negotiation between the parties such that value does not move from one party to the other until both parties are satisfied with the terms.

Thus, each party is able to decide upon the level of trust it has in the other party and if insufficient, to make use of the registry 25 as necessary until satisfied. For example, two parties trading for the first time may both seek the top level of guarantee from the registry 25. However, as the parties get to know one another, the trust level between them will increase and their reliance on the registry 25 will decrease.

Further Embodiments

The first embodiment discussed above made no use of the registry 25 for validation or for payment, as it was assumed that only a low level of validation was required and payment was made directly from the purchaser smart-card 3 to the vender smart-card 23. However, either or both parties to a transaction may wish to validate the other party with the registry 25 or make payment to or from a registry account card 33. Where the registry 25 is to be involved in a transaction, session IDs are generated as described above with reference to FIG. 7, to include the registry (for validation data) and each registry account card used (for payment) in a secure session. Where the registry 25 is to interact with the purchaser and vendor, a separate secure session with its own session ID pair is generated between the registry 25 and the vendor smart-card 23 and between the registry 25 and the purchaser smart-card 3. However, if only one of the vendor and purchaser needs to contact the registry 25 then a session having a new session ID pair will be generated between the registry 25 and the vendor smart-card 23 or the purchaser smart-card 3. Thus the overall transaction will be made up of a number of sessions, each session having its own session ID pair. In this embodiment, to ensure a common reference between the various sessions making up the transaction, each party uses the same session ID in each session of a given transaction. For example, if the purchaser smart-card 3 has already established a session with the vendor smart-card 23 (and has thus created a purchaser session ID), and then requires a session with the registry 25, the purchaser session ID used in the session with the registry 25 will be the same as the purchaser session ID already used in the session with the vendor smart-card 23. Obviously, the vendor session ID and the registry session ID will be different to one another.

Referring now to FIG. 12, there will be described a method of performing validation of the purchaser using validation data held by the registry 25 in which the purchaser is informed of the decision to validate at the registry 25 and has the option to refuse such validation. Such processing would take the place of the processing described with reference to FIG. 8 above in the first embodiment. It is assumed in the method shown in FIG. 12 that the registry 25 and the vendor smart-card 23 have already established a secure session by means of a process similar to that set out above with reference to FIG. 7.

At step S11-1, the level of validation required is determined as in step S7-1. Next, at step S11-3, the vendor terminal 21 transmits a request for validation at the registry 25 to the purchaser terminal 5. At step S11-5, the purchaser terminal 5 receives the request and at step S11-7 decides whether or not to agree to the level of validation requested. This decision is either made automatically by the purchaser terminal 5 according to predetermined rules set by the purchaser or manually by presenting the request to the purchaser on monitor 9 and awaiting acceptance or refusal of the request from the purchaser via the keyboard 11 or mouse 9. If the requested level of validation is not acceptable, then processing continues at step S11-9 where the purchaser terminal 5 transmits a disapproval of the validation request to the vendor terminal 21. The disapproval is received by the vendor terminal 21 at step S11-11, following which the transaction process terminates.

On the other hand, if the requested level of validation is agreed, then processing continues at step S11-13, at which step the purchaser terminal 5 transmits an approval of the validation request to the vendor terminal 21. Following receipt of the validation approval at step S11-15, the vendor terminal 21 transmits a validation request (identifying the purchaser) to the registry 25 at step S11-17. At step S11-19, the registry 25 receives the validation request from the vendor terminal 21 and at step S11-21 transmits the appropriate validation data back to the vendor terminal 21. The validation data is received by the vendor terminal 21 at step S11-23. Processing then proceeds as described above with reference to FIG. 8 such that the processing of steps S11-25 to S11-33 corresponds to the processing of steps S7-11 to S7-19.

Another alternative to the processing of FIG. 8 is shown in FIG. 13. In this Figure, validation of the purchaser is performed at the registry 25 but the purchaser terminal 5 is given no notice that the vendor terminal 21 is to receive validation data from the registry 25. It is assumed in the following description that the registry 25 and the vendor smart-card 23 have already established a secure session by means of a process similar to the one described with reference to FIG. 7 above.

At step S12-1, the level of validation required is determined as in step S7-1. At step S12-3, the vendor terminal 21 transmits to the registry 25 a request for validation of the purchaser, which request is received by the registry 25 at step S12-5. At step S12-7, the registry 25 transmits the validation data, which is then received by the vendor terminal 21 at step S12-9. Processing then continues as for FIG. 8 with the processing of steps S12-11 to S12-19 corresponding to the processing of steps 7-11 to steps 7-19.

A further method of validation will now be described with reference to FIG. 14. In this Figure it is the vendor which is being validated, however it should be understood that all methods of validation can be used to validate either the purchaser or the vendor or both. It is assumed in the following description that the registry 25 and the vendor smart-card 23 have established a secure session and that the registry 25 and the purchaser smart-card 3 have established a secure session by means of processing similar to that described with reference to FIG. 7 above.

At step S13-1, the level of validation required is determined as for step S8-1. At step S13-3, the purchaser terminal 5 transmits to the registry 25 a request for validation of the vendor. Following receipt of the validation request by the registry 25 at step S13-5, the registry 25 transmits to the vendor terminal 21 at step S13-7 a request for permission to validate. The request is received at step S13-9 by the vendor terminal 21, and at step S13-11 it is decided whether to agree to the level of validation requested in substantially the same manner as described above with reference to FIG. 12. If the level of validation is not agreed to then processing continues at step S13-13 where the vendor terminal 21 transmits a disapproval of the validation request to the registry 25, following which the registry 25 receives the validation disapproval at step S13-15. The transaction processing then ends.

On the other hand, if it is decided at step S13-11 that the level of validation requested is agreed, then at step S13-17, the vendor terminal 21 transmits a validation approval to the registry 25, which approval is received by the registry 25 at step S13-19. At step S13-21, the registry 25 then transmits the validation data to the purchaser terminal 5 which receives the validation data at step S13-23. Following this, the processing continues as in FIG. 9 with the processing of steps S13-25 to S13-33 corresponding to the processing of step S8-11 to S8-19.

It is also possible for payment to take place in a number of different ways. For example, as mentioned above, the registry 25 may hold account cards 33$p$, 33$v$ on behalf of users of the payment system in a smart-card server 27. The presence of these account cards make it possible for a prospective purchaser to have a large volume of funds available to spend using the payment system without having to have those funds tied into the card which they carry, which card could be lost or stolen thereby denying the user access to those funds. It is therefore possible that a purchaser may wish to make a payment from his or her account card 33$p$ or a vendor may wish to have a payment made to his or her account card 33$v$. If such a payment is to take place, then this will be agreed between the parties before payment is made. If the purchaser or the vendor decides to make payment from or to receive payment from a registry smart-card 33, then the purchaser or the vendor smart-card is informed of this and in response, it provides account details of the appropriate registry smart-card 33, from its registry data store 82. This information is then transmitted to the other smart-card so that the appropriate secure session can be established between the other smart-card and the registry smart-card. Examples of these will now be described with reference to FIGS. 14 to 16.

Referring now to FIG. 15, there will be described payment and receipting steps to replace those described above with reference to FIG. 11 where a purchaser pays from funds held on their smart-card 3 to a registry account smart-card 33$v$ held on the vendors behalf. It is assumed in the following description that the vendor registry account card 33$v$ and the vendor smart-card 23 have already established a secure session and that the vendor registry account card 33$v$ and the purchaser smart-card 3 have already established a secure session by means of processing similar to that described with reference to FIG. 7 above.

At step S14-1, the vendor smart-card 23 transmits to the purchaser smart-card 3 a request for payment, which request is received at step S14-3. At step S14-5, the purchaser smart-card 3 transmits the appropriate payment to the vendor account card 33$v$ at the vendor account card 33$v$ registry 25, which payment is received by the vendor account card 33$v$ at step S14-7. At step S14-9, the vendor account card 33$v$ then transmits to the vendor smart-card 23 an acknowledgement that the payment has been made which acknowledgement is received at step S14-11 by the vendor smart-card 23. The receipting process now continues as in FIG. 11 with the processing of steps S14-13 to S14-25 corresponding to the processing of steps S10-9 to S10-21.

Referring now to FIG. 16, there will be described a method of payment to the vendor's smart-card 23 from the purchaser's registry account card 33$p$. It is assumed in the following description that the purchaser smart-card 3 has already transmitted account details of the purchaser's registry account card 33$p$ to the vendor smart-card 23, that the registry account card 33$p$ and the vendor smart-card 23 have established a secure session and that the purchaser registry account card 33$p$ and the purchaser smart-card 3 have already established a secure session by means of processing similar to that described with reference to FIG. 7 above.

At step S15-1, the vendor smart-card 23 requests payment from the purchaser smart-card 3. Following receipt of the request for payment by the purchaser smart-card 3 at step S15-3, the purchaser smart-card 3 transmits, at step S15-5, to the purchaser's registry account card 33$p$, an instruction to make the payment. At step S15-7, the registry account card 33$p$ receives the payment instruction and at step S15-9, it transmits the payment to the vendor smart-card 23. The payment is received by the vendor smart-card 23 at step S15-11, following which the receipting procedure proceeds as in FIG. 11, whereby the processing of steps S15-13 to steps S15-25 corresponds to the processing of steps S10-9 to S10-21.

Referring now to FIG. 17, there will be described the processing where payment is made from the purchaser's registry account card 33$p$ to the vendor's registry account card 33$v$. It is assumed in the following description that the purchaser smart-card 3 and the vendor smart-card 23 have received details of the other's registry account cards 33$p$,33$v$; that the two registry account cards 33$p$ and 33$v$ have already established a secure session between each other; that the purchaser registry account card 33$p$ and the purchaser smart-card 3 have already established a secure session between each other; and that the vendor registry account card 33$v$ and the vendor smart-card 23 have already established a secure session between each other.

At step S16-1, the vendor smart-card 23 transmits a request for payment to the purchaser smart-card 3, which request is received at step S16-3. At step S16-5, the purchaser smart-card 3 transmits a payment instruction to the purchaser's registry account card 33$p$, which payment instruction is received at step S16-7. The purchaser account card 33$p$ then effects the payment to vendor's registry account card 33$v$ at step S16-9. At step S16-11, the vendor's registry account card 33$v$ transmits a payment acknowledgement to the vendor smart-card 23 which acknowledgement is received at step S16-13. Thereafter, the receipting process between the purchaser smart-card 3 and the vendor smart-card 23 continues as in FIG. 11, with the processing of steps S16-15 to S16-27 corresponding to the processing of steps S10-9 to S10-21.

A further optional feature of the payment system described in any of the above embodiments is that a smart-card for use with the payment system may hold funds in a number of different currencies. It will be possible to load funds onto a purchaser's smart-card 3 or registry account card 33$p$ in the required currency or it would be possible to convert funds held on the card. Conversion between currencies could take place on a particular user card 3 or 23 or, as would be preferable from a fraud control point of view, conversion could be undertaken on a user's registry account card 33 under the control of the registry 25 to prevent fraudulent currency creation. The process of currency conversation does not entail the actual conversion of one currency into another, rather it implies debiting an amount in one currency and crediting the equivalent amount in another currency. The implications of this are twofold;

1) external (off card) funds must be held in the currency to be supplied;
2) the exchange rate will be externally (off card) supplied.

An example of how conversion of funds within a registry account card 33 could be accomplished by a user will now be described with reference to FIG. 18.

Before the currency conversion process may commence, a secure session between the user's own card 3 or 23 and the registry card 33p or 33v, respectively must be established. This is achieved in the same manner as described above with reference to FIG. 6. Thus steps S17-1 to S17-19 correspond to steps S6-9 to S6-27 in that the user card 3 transmits its public key to the registry card which, following receipt of the user card public key, generates a registry session ID in the same manner as the session IDs were generated with reference to FIG. 7 above. The registry smart-card 33p or 33v then encrypts the registry session ID with the cardholder public key and transmits the encrypted session ID and the registry public key back to the user smart-card 3. The user smart-card 3 then generates a user session ID, encrypts it with the registry public key and transmits the encrypted user session ID to the registry. Once the registry smart-card 33p or 33v has received the encrypted user session ID, it transmits a message to the user card 3 stating that the session ID was received successfully. Following this, at step S17-21 the cardholder terminal 5 transmits a request for conversion of account funds from a first currency to a second currency which request is received by the registry 25 at step S17-23. At step S17-25, the registry 25 performs a check to determine whether the account card 33 holds sufficient funds to perform the currency conversion. If it is determined that sufficient funds are not present, then processing continues at step S17-27, where the registry 25 transmits to the cardholder terminal 5 that there are insufficient funds in the account card 33p to perform a conversion. This is received by the cardholder terminal 5 at step S17-29, following which the conversion procedure terminates. On the other hand, if it is determined at step S17-25 that there are sufficient funds in the account to perform the currency conversion then at step S17-31 the funds are converted and at step S17-33 the registry 25 transmits to the cardholder terminal 5 a confirmation that the funds have been converted and a note of the funds totals in the relevant currencies available on the registry account card following the conversion. This is received by the card holder terminal 5 at step S17-35, following which the currency conversion procedure terminates.

A further feature which may be applied to the payment system according to any of the described embodiments is that transaction logging may be undertaken. At the end of a given transaction, both the vendor and purchaser will have stored in the transaction log store 80 of their respective smart-cards 3, 23 a record of all of the data transferred during the transaction. This record will include the goods or services specified, any validation data concerning the purchaser or vendor, any delivery data and payment data. Each party to the transaction therefore has a complete record of that transaction. A limited number of such transaction records may be held by the smart-card 3, 23 to provide a short-term transaction log. However, due to the memory limitations of smart-cards, it is not likely to be possible for the smart-card to store a complete log of all transactions in which the particular smart-card 3, 23 is involved. Therefore, the smart-cards are programmed to allow the transaction records to be copied from the transaction log store 80 into a full transaction log within a personal computer or the like. For example, a vendor may set up an automatic process through their usual vending terminal such that at the completion of any transaction, a copy of that transaction record is made on a central transaction log held within the vendor terminal or in a further terminal which is connected to the vendor terminal. A purchaser may for example, have a home computer comprising a smart-card reader into which the user smart-card 3 may be inserted such that records of purchases made using the smart-card 3 may be transferred to a log on the home computer. In addition, the registry 25 may be configured to automatically save details of all transactions in which it is involved in order to provide a centralised accountability for the payment system.

In the above embodiments, different levels of validation were described. Some practical trading examples will now be described that illustrate how these different levels of validation would be used.

VALIDATION LEVEL EXAMPLES

Internet Trading Example 1

In this example, a user of the payment system wishes to purchase weather forecast data from the UK Meteorological Office. The purchaser knows he is at the Meteorological Office website and trusts them to deliver the requested information. There is no reason for the purchaser to carry out any further checking on the vendor. The Meteorological Office does not care who the purchaser is or where they are located. The information to be purchased is not restricted in any way. In addition, the Meteorological Office will collect payment from the purchasers smart-card before shipping the requested information. So the vendor requires no further information about the purchaser and an immediate anonymous trade can take place subject to both parties indicating their satisfaction with the price and terms of trade.

Internet Trading Example 2

In this example, the purchaser wishes to buy videos from an internet discount store. In this case the value of the trade will be low but checking is required by both parties. The vendor will wish to assure itself that the purchaser is of a suitable age to purchase the videos requested, while the purchaser will wish to validate the credentials and location of the vendor to ensure that the vendor will not simply take the purchaser's money and disappear, never delivering the goods.

The vendor could simply ask a purchaser for their age and address but there would be no support for this information, which therefore could not be trusted. The vendor would therefore check the credentials of the purchaser with the registry 25 and if the purchaser was not registered or refused to permit the information to be released, the vendor could refuse to sell the products to this purchaser. If the information were provided, only a low confidence level would probably be required and the registry 25 would provide no warranties or guarantees.

The purchaser would wish to be assured that the vendor can be trusted. To achieve this, the purchaser would check that the vendor had a registry account and that the vendor would allow the registry 25 to release/confirm the address of the vendor. Only under these circumstances would the purchaser agree to make the trade.

When both parties are satisfied with the information supplied, the sale price, the transaction charges and the terms of trading, the sale would be completed and value transferred. In subsequent trades between the two parties, it is likely that the purchaser will have built up a level of trust in the vendor such that the purchaser will not seek any validation from the registry.

Internet Trading Example 3

This example concerns the purchase of fine art. In this circumstance a great deal of checking and validation will be required. Even though the vendor will be paid immediately, the vendor may need to verify the nationality and domicile of a purchaser. The vendor may also wish to avoid being part of a possible money laundering exercise and will therefore seek the most exhaustive credentials concerning a purchaser with the highest level of confidence.

The purchaser will also need to have more guarantees than simply the credentials of the vendor. Since the fine art cannot be authenticated until it is shipped (or the benefit of using the internet will be lost), and since the goods may be damaged in transit, the purchaser may seek a cash back guarantee from the smart-card registry 25. For this purpose, the registry 25 may be underwritten to supply such a guarantee with the properly authenticated vendors but of course is likely to levy a high transaction charge for this service.

Once all parties have agreed to the levels of confidence they have been given, agreed prices, transaction charges and terms and conditions, the trade may be completed. Given the high value of the deal, it is likely that payment will be made from an account card held by the registry on the purchaser's behalf, rather than his or her personal card. In addition, it may be possible for the registry operator to function as a credit providing service such that users of the payment system may be able to borrow money from the registry to be paid back at a later date as with a traditional credit card 25.

Real World Trading Example 1

For the purpose of purchasing goods such as a newspaper the smart-card of the payment system according to the present invention may be used as a "traditional" electronic purse at any shop accepting the card. To make a newspaper purchase the cardholder will simply use his or her card in an anonymous manner to make the purchase using a purchaser smart-card reader provided within the shop.

Real World Trading Example 2

For the purchase of a larger value item such as a television, the purchaser may have sufficient value on their personal card to make payment or they may indicate their desire to pay from the registry account card in much the same way as a traditional bank debit card payment. In either event, the vendor will wish to validate the credentials of the purchaser to check that the card has not been lost or stolen and that a registry account is not being fraudulently used. In the case of account payment, the vendor will also take payment from the registry 25.

For this purpose the vendor will need a simple smart-card terminal capable of connectivity either directly to the registry or via the internet. Such terminal may be similar to the bank/credit card terminal currently in use for debit and credit card payments. Since the purchaser is physically in the vendor's shop it is unlikely that they will seek any further accreditation of the vendor, however this is always possible. For example, the purchaser may wish to obtain guarantees about the delivery date and goods quality for purpose made goods. To achieve this, the purchaser will make use of a vendor's terminal to contact the registry and seek the necessary guarantees. Once all terms have been agreed, the purchaser can authorise payment to be made in exactly the same way as in the case with internet trading.

Real World Trading Example 3

Booking or purchasing a ticket from an unattended terminal is the same as internet trading. For ticket purchases, it will be possible for a physical paper ticket to be issued via the terminal, for a ticket to be delivered to the vendor following the purchase transaction at the terminal or for an electronic ticket to be written to the purchaser's smart-card. This is possible because a smart-card is not restricted to holding programs and/or data for a single purpose but may have a number of separate application entities on the same card. In particular, technologies such as Sun Microsystems Inc's JavaCard™ technology allow applications to be written to a smart-card at any time. Thus the user of a smart-card equipped with programming to perform processing to enable it to participate in the payment system of the present invention could decide that the ability to have electronic tickets written to his or her card would be useful and therefore arrange for software to enable that function to be written to his or her card at any time.

Although it has been described above with reference to FIGS. 1 to 16 that the purchaser terminal 5 and the vendor terminal 21 are physically separated and connected via the internet, it is possible that a cardholder may wish to use their smart-card at the vendor's location. This situation is discussed in the above trading examples, and is shown in a simplified form in FIG. 19. In FIG. 19, the vendor terminal 21 having a monitor 9, a keyboard 11 and a mouse 13, which terminal may be combined with or a part of a shop cash register or till, is equipped with a smart-card reader 31 into which the vendor smart-card 23 may be inserted. For security purposes it may be preferable for the smart-card slot 31 to be physically separated from the terminal 21 and connected via a cable or other data communications link because the terminal 21 may be in an area accessible to customers and having the smart-card 23 in such a location could be perceived to be a security risk. As before, the vendor terminal 21 is equipped with a modem 15 by means of which it may communicate with the registry terminal 25 by transmitting signals 17 via the internet 19 or by a telephone line.

Also connected to the vendor terminal 21 is a user smart-card reader 34 into which the user smart-card 3 may be inserted by a purchaser when a purchase is to be made using the payment system of the present embodiment. In such circumstances, there is obviously no need for communication between the purchaser smart-card 3 and the vendor smart-card 23 to take place via the internet and thus the same process as described above with reference to flow diagrams 4 to 16 may be performed as shown but with communication between the cards 3 and 23 taking place via the cables connecting the user smart-card reader 34 to the vendor smart-card reader 31.

It should be noted that in the above-described arrangement, the vendor and purchaser smart-cards still create a secure session to wrap the transaction to provide full transaction accountability and traceability, to provide a secure channel between the cards to transfer funds, and to enable data to be certified, all as described above.

In the event that either the purchaser or the vendor should wish to validate the other party at the registry or make payment from or receive payment to a registry account card this may be achieved using the internet connection to the registry terminal 25.

Referring to FIG. 20, there is shown a block diagram of the main functional components of the vendor terminal 21 used in this embodiment. As before, a CPU making use of a working memory 43 to perform instructions stored in software store 47, a keyboard and mouse interface 49 to receive input from a user and a monitor interface 51 to output information to a user are present and are connected via a data bus 45. Also connected via the data bus 45 is the modem 55 for communication with the registry terminal 25 via the internet 19 or telephone line. The vendor smart-card reader interface 59 and the purchaser smart-card reader 61 are also connected to the data bus 45.

Although it has been described above that the various terminals communicate with one another via the internet, the terminals may be connected together via a Local Area Network (LAN) or a Wide Area Network (WAN). In addition, it is possible that the terminals could perform a so-called "tunnelling" operation to create a Virtual Private Network (VPN) between the terminals across the internet, or a direct dial telephone link between the terminals may be used.

Although it has been described above that where particular validation data or particular delivery terms are decided to be unacceptable the transaction process terminates, further negotiations between the two parties could be undertaken to resolve such situations. For example, a prospective purchaser may select a product and request next day delivery, but then decide that the cost for next day delivery is more than he or she is willing to pay. It could be made possible for the prospective purchaser to request to be offered a cheaper delivery service which they might then accept.

Although it has been described above, particularly with reference to FIG. 5, that validation of a purchaser is performed before validation of the vendor, it is not essential that the validations are performed in this order and therefore validation of a vendor could be performed before validation of the purchaser or even at the same time.

Although, it has been described above with reference to FIG. 5 that a step is taken to determine whether or not to validate the purchaser or vendor followed by which the level of validation required is determined, it is possible that these two steps could be combined into one single operation, wherein if no validation is required the steps to achieve validation could be omitted.

Although it is described above with reference to FIG. 9 that a purchaser is required to enter delivery data when required, it is possible that such data could be stored within the purchaser terminal or purchaser smart-card and the transfer of such data to the purchaser terminal could be achieved without reference to the purchaser.

Although it is described above that the registry 25 stores validation data, it is possible that the validation data could be stored on the registry account card 33v, 33p.

Although it is described above that a single registry 25 is present, it is possible that a number of registries could exist. In this case it would become necessary to establish which registry should be queried to receive validation data from the party to be validated. For simplicity, this information is preferably stored on the party's smart-card.

Although it has been described with reference to FIG. 4 that delivery data is transmitted after validation, it is entirely possible to include delivery data within the validation data. This is a favourable modification to the above system as it is likely that validation data would include address data and therefore duplication of data can be reduced and thus transaction processing time can be reduced. The delivery data would always be transmitted after establishing the session, but need not necessarily be encrypted.

Although it has been described above with reference to FIG. 7 that a specific security arrangement is used to establish the secure session, it is to be noted that the security algorithms used by the smart-cards and the operation of the security engine on the smart-cards does not matter, provided that an asymmetric key system of the type used in public key encryption is used. Examples of encryption schemes which could be used are RSA type algorithms and elliptic curve techniques. However, it is not an open public key system requiring a certification authority to validate ownership, rather it is a private system known only to the smart-cards themselves.

Although it has been described above with reference to FIG. 7 that all data passing between the terminals (and the registry) will be encrypted by the smart-card 3, 23, 33 in the terminal (or registry) before transmission, it is not necessary for all data to be encrypted. Only the data which the parties do not wish to be general public knowledge (which could happen if the data were intercepted) and the data which requires certification as to its origin and validity (such as validation data), and therefore requires a "digital signature", need be encrypted. As those skilled in the art will appreciate, the function of the secure session IDs of digitally signing the transmitted data to certify validity and origin could be achieved by methods other than that described above. In particular, a number of techniques of so-called "digital watermarking" exist, which could be used to certify the data, or encryption keys themselves could be used as signatures.

Although it has been described above that the various terminals have specific components and arrangements, it is sufficient for the performance of the embodiments that any stand alone terminal has a card reader, a means for presenting data to and requesting data from a user, means for receiving user input and means for communicating with other terminals. Thus it is not necessary for the terminal to be a desk-top computer. It is possible that terminals may take the form of railway, airline or bus ticket vending machines, public information booths or terminals, theatre or cinema ticketing booths, shop tills, portable computers, hand-held computers and information appliances, telephones and tourist attraction entry gates, for example. As those skilled in the art will appreciate, the present invention can be used not only from a purchaser's own home terminal but from terminals in so-called internet cafes and in other public terminals.

Although it has been described above with reference to FIGS. 11 to 16 that the registry or a registry account card is included in the secure session before a request for validation data or payment is made to the registry or account card, it is possible that the registry or registry account card will only be included in the secure session when validation data or payment is requested.

Although it has been described above that a user would hold funds on their user smart-card and may hold further funds on their registry account card, it is possible to operate the entire system in the manner of a credit card system whereby a user holds no funds on their own smart-card or on their registry account card, but every time they wish to make a purchase requesting payment from the registry account, and funds being provided to the registry account by the registry on a credit basis with the money supplied as credit to be repaid by the user according to predetermined practices. It is also possible for the system to be operated in a combination of a stored cash and credit based system whereby a user may store small amounts of cash on their personal smart-card or on their registry account card, but for large purchases make use of a credit arrangement with the registry provider. Such a system would address the problem of previous smart-card systems whereby funds held on the card are "locked in" to the card.

The smart-cards used to implement the present invention may use any standard interface. There is an International Standard (ISO7816-3) which governs the so-called contact interface where the microchip on the smart-card interfaces with a reader by means of physical contacts between the microchip on the smart-card and the reader. There is a further International Standard (ISO14443) which governs the so-called contactless interface. In this interface, the microchip on the smart-card and the reader have no physical connection, all communication between the reader and the smart-card, including supply of power to the smart-card, is performed using radio transmissions. It is also possible to implement the invention using a smart-card capable of using both of the above interface types.

As described above, the smart-cards 3,23,33 may be implemented using multi-programmable technologies such as Sun Microsystems Inc's JavaCard™ technology. It is therefore possible for a person or organisation already possessing a smart-card conforming to such a multi-programmable technology to have software to enable the smart-card as a smart-card 3,23,33 according to any of the above embodiments loaded onto their smart-card. Such software loading could be performed by an authority such as a registry operator, or the software could be transmitted to the smart-card owner via the internet or similar connection, or on a storage medium such as a floppy disk or CD-ROM for the smart-card owner to use to load the software onto the smart-card themselves.

Although it has been described above that the session IDs should be generated using a time stamp, a random number, a terminal ID and a smart-card ID, it is not necessary that the session ID be generated in this manner for the successful operation of the embodiments. As one skilled in the art would appreciate, any method of generating a new, unique session ID for each transaction that a particular smart-card 3,23,33 is involved in, could be used. This method could involve using less than all of the above parts of the session ID described in the above embodiment, or other values such as account holder identifiers or a transaction counter could be used.

The invention claimed is:

1. An electronic transaction payment system comprising:
a user terminal;
a first smart-card associated with a first user;
a first smart-card reader for transmitting data to and receiving data from said first smart-card;
a second smart-card associated with a second user;
a second smart-card reader for transmitting data to and receiving data from said second smart-card;
a registry terminal comprising an interface to interface with said user terminal;
wherein said user terminal is configured:
  i) to interface with the smart-card reader of the smart-card associated with the user that will make a payment; and
  ii) to transmit transfer data identifying a payment to be transferred between the first and second users, to a smart-card associated with the user that will make the payment via an associated smart-card reader;
wherein said first smart-card is configured to output a request for data describing the second user, for transmission to said registry terminal;
wherein said user terminal is configured to receive the request for data describing the second user output from the first smart-card and to transmit the request to said registry terminal;
wherein said registry terminal is operable to receive the request for data describing the second user from the user terminal and is operable to transmit data describing the second user, in accordance with the request, to the user terminal;
wherein said user terminal is operable to receive the data describing the second user from the registry terminal and to forward the received data to the first smart-card;
wherein the first smart-card is configured to receive said data describing the second user from said user terminal, to determine whether or not said data describing the second user conforms to a predetermined condition; and, in response to said determination, to control whether or not a payment is to be made between said first and second users;
wherein the smart-card associated with the user that will make the payment is configured:
  i) to receive said transfer data indicative of the payment to be transferred;
  ii) to encrypt payment data to be transmitted to a smart-card associated with the user that will receive the payment; and
  iii) to output the encrypted payment data for transmission to a smart-card associated with the user that will receive the payment; and
wherein a smart-card associated with the user that will receive the payment is configured:
  i) to receive said encrypted payment data; and
  ii) to decrypt said encrypted payment data to obtain the payment.

2. A system according to claim 1, wherein the smart-card associated with the user that will make the payment is associated with the first user and wherein the smart-card associated with the user that will receive the payment is associated with the second user.

3. A system according to claim 2, wherein said smart-card associated with the first user that will make the payment is the first smart-card.

4. A system according to claim 2, wherein the smart-card associated with the first user that will make the payment is a third smart-card held by the registry terminal.

5. A system according to claim 2, wherein the smart-card associated with the second user that will receive the payment is the second smart-card.

6. A system according to claim 2, wherein the smart-card associated with the second user that will receive the payment is a fourth smart-card held by the registry terminal.

7. A system according to claim 1, wherein the smart-card associated with the user that will make the payment is associated with the second user and wherein the smart-card associated with the user that will receive the payment is associated with the first user.

8. A system according to claim 7, wherein said smart-card associated with the second user that will make the payment is the second smart-card.

9. A system according to claim 7, wherein the smart-card associated with the second user that will make the payment is a third smart-card held by the registry terminal.

10. A system according to claim 7, wherein the smart-card associated with the first user that will receive the payment is the first smart-card.

11. A system according to claim 7, wherein the smart-card associated with the first user that will receive the payment is a fourth smart-card held by the registry terminal.

12. A system according to claim 1, wherein the smart-card associated with the user that will make the payment is configured to digitally sign said payment data using a payer digital signature and wherein the smart-card associated with the user that will receive the payment is configured to read the digital signature applied to the payment data to establish the origin of the payment.

13. A system according to claim 12, wherein said smart-card associated with the user that will receive the payment is configured to generate receipt data for the payment obtained from said payment data, to digitally sign said receipt data using a payee digital signature; and to output the signed receipt data for transmission to said smart-card associated with the user that will make the payment; and wherein said smart-card associated with the user that will make the payment is configured to receive said signed receipt data and to read the payee digital signature applied to the receipt data to establish the origin of the receipt.

14. A system according to claim 13, wherein at least one of each said digital signatures is generated using a time stamp.

15. A system according to claim 13, wherein at least one of each said digital signatures is generated using a random number.

16. A system according to claim 13, wherein at least one of each said digital signatures is generated using a smart-card identifier.

17. A system according to claim 13, wherein at least one of said digital signatures is generated using a terminal identifier.

18. A system according to claim 13, wherein each of said digital signatures is different.

19. A system according to claim 13, wherein said digital signatures are the same.

20. An electronic transaction payment system according to claim 12, wherein the smart-card associated with the user that will make the payment is configured to digitally sign said payment data by encrypting the payment; and wherein the smart-card associated with the user that will receive the payment is configured to read said payer digital signature by decrypting the encrypted payment.

21. A system according to claim 1, wherein:
said user terminal is operable to output said request for data describing the second user to said second smart-card; and
wherein said second smart-card is configured to receive said request for data describing the second user; to generate data describing the second user in accordance with said request; and
to output the data describing the second user to said user terminal.

22. A system according to claim 1, wherein said first smart-card is configured to receive said data describing the second user from said second smart-card; and to determine whether or not said data describing the second user conforms to a predetermined condition to determine whether or not said payment is to be made between said first and second users.

23. A system according to claim 1 wherein:
said user terminal is operable to receive a request for data describing the first user; and to output said request for transmission to said first smart-card; and
wherein said first smart-card is configured: to receive said request for data describing the first user; to generate data describing the first user in accordance with said request; and to output the data describing the first user for transmission to said user terminal.

24. A system according to claim 23, wherein said second smart-card is configured to receive said data describing the first user from said first smart-card; and to determine whether or not said data describing the first user conforms to a predetermined condition to determine whether or not said payment is to be made between said first and second users.

25. A system according to claim 1, wherein said smart-card associated with the user that will receive the payment comprises a memory for storing an asymmetric encryption key pair comprising a payee private key and a payee public key; and is configured to output said payee public key for transmission to said smart-card associated with the user that will make the payment, which smart-card is configured to receive said payee public key, and to encrypt said payment data using said payee public key; and
wherein said smart-card associated with the user that will receive the payment is configured to decrypt the payment data using the payee private key.

26. A system according to claim 25, wherein said asymmetric encryption key pair are generated using an RSA algorithm.

27. A system according to claim 25, wherein said asymmetric encryption key pair are generated using an elliptic curve algorithm.

28. A system according to claim 1, wherein said user terminal is operable to interface with the smart-card reader of the smart-card associated with the user that will make the payment via a computer network.

29. A system according to claim 1, wherein said user terminal is operable to interface with the smart-card reader of the smart-card associated with the user that will make the payment via the Internet.

30. A system according to claim 1, wherein said first smart-card is associated with a vendor that provides goods or services to a purchaser, wherein said second smart-card is associated with a purchaser and wherein the second smart-card is configured to output the payment data to the vendor smart-card for goods or services provided by the vendor to the purchaser.

31. A system according to claim 1, wherein said second smart-card is associated with a vendor that provides goods or services to a purchaser, wherein said first smart-card is associated with the purchaser and wherein the first smart-card is configured to transmit said payment data to said vendor in respect of goods or services provided to the purchaser by the vendor.

32. A system according to claim 30, wherein said user terminal is a vendor terminal associated with the vendor.

33. A system according to claim 32, further comprising a purchaser terminal associated with the purchaser, the purchaser terminal being operable:
i) to generate a request for vendor goods or services from said purchaser;
ii) to interface with the purchaser smart-card reader;
iii) to interface with said vendor terminal; and
iv) to transmit said purchaser requests to said vendor terminal via said purchaser smart-card.

34. A system according to claim 33, wherein data transmitted between said purchaser terminal and said vendor terminal is encrypted before transmission by the respective smart-cards.

35. A system according to claim 1, wherein said first smart-card and said second smart-card are configured to provide a number of different levels of validation of the other party to the transaction, wherein one level of validation causes the smart-card to request data describing the other party to the transaction from the registry terminal, and wherein another level of validation causes the smart-card not to request the data describing the other party to the transaction from the registry terminal.

36. A system according to claim 1, wherein each smart-card involved in the transaction is configured to use a common session ID to tag each data communication relating to the same transaction, thereby linking all communications relating to the same transaction.

37. A system according to claim 1, wherein the first or second smart-card associated with the user that will make the payment is configured to transmit payment instructions, for paying the payee, to a registry smart-card held by said registry terminal and wherein the registry smart-card is configured to provide credit to the payer and to pay the payee.

38. A system according to claim 1, wherein the smart-card associated with the user that will make the payment is configured to make said payment from funds stored therein or to instruct payment from a registry smart card held by said registry terminal.

39. A system according to claim 1, wherein said first smart card is configured to determine whether or not said data describing the second user conforms to a predetermined condition on the basis of a user input.

40. A system according to claim 1, further comprising a registry smart-card and a registry smart-card reader that are associated with the registry terminal, wherein said registry terminal is operable to interface with said registry smart-card reader and to forward the request for data describing the second user to said registry smart-card, wherein said registry smart-card is configured:
- to receive said request for data describing the second user;
- to generate data describing the second user, in accordance with said request; and
- to output the data describing the second user for transmission to the first smart-card; and wherein the registry terminal is operable to receive the data describing the second user output from the registry smart-card.

* * * * *